United States Patent
Hirose et al.

(10) Patent No.: US 10,629,890 B2
(45) Date of Patent: Apr. 21, 2020

(54) NEGATIVE ELECTRODE MATERIAL FOR NON-AQUEOUS ELECTROLYTE SECONDARY BATTERY, NEGATIVE ELECTRODE FOR NON-AQUEOUS ELECTROLYTE SECONDARY BATTERY, NON-AQUEOUS ELECTROLYTE SECONDARY BATTERY, AND METHOD OF PRODUCING NEGATIVE ELECTRODE ACTIVE MATERIAL PARTICLES

(71) Applicant: SHIN-ETSU CHEMICAL CO., LTD., Tokyo (JP)

(72) Inventors: Takakazu Hirose, Annaka (JP); Hiroki Yoshikawa, Takasaki (JP); Hiromichi Kamo, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 272 days.

(21) Appl. No.: 15/321,804

(22) PCT Filed: Mar. 26, 2015

(86) PCT No.: PCT/JP2015/001727
§ 371 (c)(1),
(2) Date: Dec. 23, 2016

(87) PCT Pub. No.: WO2015/198511
PCT Pub. Date: Dec. 30, 2015

(65) Prior Publication Data
US 2017/0149050 A1  May 25, 2017

(30) Foreign Application Priority Data
Jun. 23, 2014 (JP) ................................ 2014-128479

(51) Int. Cl.
*H01M 4/131* (2010.01)
*H01M 10/0569* (2010.01)
(Continued)

(52) U.S. Cl.
CPC ........... *H01M 4/131* (2013.01); *H01M 4/133* (2013.01); *H01M 4/134* (2013.01);
(Continued)

(58) Field of Classification Search
CPC .... H01M 4/133; H01M 4/134; H01M 4/1395; H01M 4/366; H01M 4/386; H01M 4/483
See application file for complete search history.

(56) References Cited

U.S. PATENT DOCUMENTS 5,395,711 A   3/1995   Tahara et al.
7,459,236 B2  12/2008  Konishiike et al.
(Continued)

FOREIGN PATENT DOCUMENTS

CN   100490223 C   5/2009
JP   2997741 B2    1/2000
(Continued)

OTHER PUBLICATIONS

Machine translation of JP 2004185931 A.*
(Continued)

*Primary Examiner* — Jonathan G Jelsma
(74) *Attorney, Agent, or Firm* — Oliff PLC

(57) ABSTRACT

The present invention is a negative electrode material for a non-aqueous electrolyte secondary battery, including negative electrode active material particles composed of a silicon compound ($SiO_x$, where $0.5 \leq x \leq 1.6$) containing a lithium compound, the negative electrode active material particles being coated with a coating containing at least two of a substance having two or more hydroxyl groups per molecule, phosphoryl fluoride, lithium carbonate, and a hydro-
(Continued)

carbon that exhibits a positive ion spectrum $C_yH_z$ ($1 \leq y \leq 3$ and $2 \leq z \leq 5$) when subjected to TOF-SIMS. There can be provided a negative electrode material for a non-aqueous electrolyte secondary battery, a non-aqueous electrolyte secondary battery including a negative electrode using this negative electrode material, and a method of producing negative electrode active material particles that can increase the battery capacity and improve the cycle performance and initial charge and discharge performance.

18 Claims, 2 Drawing Sheets

(51) Int. Cl.
| | |
|---|---|
| *H01M 4/36* | (2006.01) |
| *H01M 4/48* | (2010.01) |
| *H01M 4/1395* | (2010.01) |
| *H01M 4/134* | (2010.01) |
| *H01M 4/133* | (2010.01) |
| *H01M 4/38* | (2006.01) |
| *H01M 4/1391* | (2010.01) |
| *H01M 4/485* | (2010.01) |
| *H01M 4/587* | (2010.01) |
| *H01M 4/62* | (2006.01) |
| *H01M 10/0525* | (2010.01) |
| *H01M 4/02* | (2006.01) |

(52) U.S. Cl.
CPC ....... *H01M 4/1391* (2013.01); *H01M 4/1395* (2013.01); *H01M 4/36* (2013.01); *H01M 4/366* (2013.01); *H01M 4/386* (2013.01); *H01M 4/483* (2013.01); *H01M 4/485* (2013.01); *H01M 4/587* (2013.01); *H01M 4/622* (2013.01); *H01M 10/0525* (2013.01); *H01M 10/0569* (2013.01); *H01M 2004/027* (2013.01); *H01M 2220/30* (2013.01); *H01M 2300/0037* (2013.01); *Y02T 10/7011* (2013.01)

(56) References Cited

U.S. PATENT DOCUMENTS

| | | | |
|---|---|---|---|
| 8,377,592 | B2 | 2/2013 | Jeong et al. |
| 9,112,212 | B1* | 8/2015 | Fasching ............... H01M 4/134 |
| 2003/0118905 | A1 | 6/2003 | Fukuoka et al. |
| 2003/0215711 | A1* | 11/2003 | Aramata ................ B82Y 30/00 |
| | | | 429/218.1 |
| 2004/0234856 | A1 | 11/2004 | Morigaki et al. |
| 2006/0099507 | A1 | 5/2006 | Kogetsu et al. |
| 2006/0099512 | A1 | 5/2006 | Nakai et al. |
| 2006/0134524 | A1 | 6/2006 | Nakai et al. |
| 2008/0176137 | A1 | 7/2008 | Endo et al. |
| 2009/0202911 | A1 | 8/2009 | Fukuoka et al. |
| 2011/0244334 | A1 | 10/2011 | Kawada |
| 2013/0149606 | A1 | 6/2013 | Yasuda et al. |
| 2013/0224575 | A1* | 8/2013 | Kojima ................. H01M 4/134 |
| | | | 429/199 |
| 2013/0244106 | A1* | 9/2013 | Chang ................... H01M 4/587 |
| | | | 429/211 |
| 2014/0093761 | A1 | 4/2014 | Sakanaka et al. |
| 2014/0120415 | A1* | 5/2014 | Suguro ............. H01M 10/0567 |
| | | | 429/200 |
| 2014/0356724 | A1 | 12/2014 | Iwami |
| 2015/0372294 | A1* | 12/2015 | Minami .................. H01M 4/13 |
| | | | 429/231.8 |
| 2017/0012290 | A1* | 1/2017 | Watanabe ............. H01M 4/134 |

FOREIGN PATENT DOCUMENTS

| | | | |
|---|---|---|---|
| JP | 2001-185127 A | | 7/2001 |
| JP | 2002-042806 A | | 2/2002 |
| JP | 2004185931 A | * | 7/2004 |
| JP | 2005-011801 A | | 1/2005 |
| JP | 2005-025963 A | | 1/2005 |
| JP | 2006-114454 A | | 4/2006 |
| JP | 2006-139967 A | | 6/2006 |
| JP | 2006-156008 A | | 6/2006 |
| JP | 2006-164954 A | | 6/2006 |
| JP | 2007-234255 A | | 9/2007 |
| JP | 2008-177346 A | | 7/2008 |
| JP | 2008-251369 A | | 10/2008 |
| JP | 2008-282819 A | | 11/2008 |
| JP | 2009-070825 A | | 4/2009 |
| JP | 2009-205950 A | | 9/2009 |
| JP | 2009-212074 A | | 9/2009 |
| JP | 2010-092830 A | | 4/2010 |
| JP | 2011-222153 A | | 11/2011 |
| JP | 2013-187033 A | | 9/2013 |
| JP | 2014-103019 A | | 6/2014 |
| WO | 2012/026067 A1 | | 3/2012 |
| WO | 2013/094668 A1 | | 6/2013 |

OTHER PUBLICATIONS

Jun. 13, 2017 Office Action issued in Japanese Patent Application No. 2014-128479.
Aug. 3, 2018 Office Action issued in European Patent Application No. 15811848.9.
Cao Cuong Nguyen et al. "Roles of Oxygen and Interfacial Stabilization in Enhancing the Cycling Ability of Silicon Oxide Anodes for Rechargeable Lithium Batteries". Journal of the Electrochemical Society, vol. 160, No. 6, Apr. 10, 2013, pp. A906-A914.
Ryo Nagai et al. "Development of Highly Reliable High-Capacity Batteries for Mobile Devices and Small- to Medium-Sized Batteries for Industrial Applications". Hitachi Review, vol. 60, No. 1, Feb. 1, 2011, pp. 28-32.
Philippe et al., "Nanosilicon Electrodes for Lithium-Ion Batteries: Interfacial Mechanisms Studied by Hard and Soft X-Ray Photoelectron Spectroscopy," Chemistry of Materials, 2012, vol. 24, pp. 1107-1115.
Oct. 16, 2017 Extended Search Report issued in European Patent Application No. 15811848.9.
Jun. 9, 2015 International Search Report issued in International Patent Application No. PCT/JP2015/001727.
Oct. 26, 2018 Office Action Issued in Chinese Patent Application No. 201580033985.0.
Aug. 9, 2019 Office Action issued in European Patent Application No. 15 811 848.9.

* cited by examiner

NEGATIVE ELECTRODE MATERIAL FOR NON-AQUEOUS ELECTROLYTE SECONDARY BATTERY, NEGATIVE ELECTRODE FOR NON-AQUEOUS ELECTROLYTE SECONDARY BATTERY, NON-AQUEOUS ELECTROLYTE SECONDARY BATTERY, AND METHOD OF PRODUCING NEGATIVE ELECTRODE ACTIVE MATERIAL PARTICLES

TECHNICAL FIELD

The present invention relates to a negative electrode material for a non-aqueous electrolyte secondary battery, a non-aqueous electrolyte secondary battery, and a method of producing negative electrode active material particles.

BACKGROUND ART

In recent years, small electronic devices, represented by mobile terminals, have been widely used and urgently required to reduce the size and weight and to increase the life. Such requirement has advanced the development of particularly small, lightweight secondary batteries with higher energy density.

These secondary batteries are considered to find application not only for small electronic devices but for large electronic devices such as, typically, automobiles as well as power storage systems such as, typically, houses.

Among those, lithium-ion secondary batteries are easy to reduce the size and increase the capacity and have higher energy density than those of lead or nickel-cadmium batteries, receiving considerable attention.

The lithium-ion secondary battery has positive and negative electrodes, a separator, and an electrolyte. The negative electrode includes a negative electrode active material related to charging and discharging reactions.

The negative electrode active material, which is usually made of a carbon material, is required to further improve the battery capacity for recent market requirement.

Use of silicon as a negative electrode active material is considered to improve the battery capacity, for silicon has a logical capacity (4199 mAh/g) ten times larger than does graphite (372 mAh/g). Such a material is thus expected to significantly improve the battery capacity.

The development of silicon materials for use as negative electrode active materials includes not only silicon as a simple but also alloy thereof and a compound thereof such as typically oxides.

The consideration of active material shapes ranges from an application type, which is standard for carbon materials, to an integrated type in which the materials are directly accumulated on a current collector.

Use of silicon as a main material of a negative electrode active material, however, expands or shrinks the negative electrode active material when charging or discharging, thereby making the negative electrode active material easy to break particularly near its surface layer. In addition, this active material produces ionic substances in its interior and is thus easy to break.

The breakage of the surface layer of the negative electrode active material creates a new surface, increasing a reaction area of the active material. The new surface then causes the decomposition reaction of an electrolyte and is coated with a decomposition product of the electrolyte, thereby consuming the electrolyte. This makes the cycle performance easy to reduce.

Various materials and configurations of a negative electrode for a lithium-ion secondary battery mainly using a silicon material have been considered to improve the initial efficiency and the cycle performance of the battery.

More specifically, a vapor deposition method is used to accumulate silicon and amorphous silicon dioxide simultaneously so that better cycle performance and greater safety are achieved (See Patent Document 1, for example).

Moreover, a carbon material, an electronic conduction material, is disposed on the surface of silicon oxide particles so that higher battery capacity and greater safety are achieved (See Patent Document 2, for example).

Moreover, an active material including silicon and oxygen is produced to form an active material layer having a higher ratio of oxygen near a current collector so that improved cycle performance and higher input-output performance are achieved (See Patent Document 3, for example).

Moreover, silicon active material is formed so as to contain oxygen with an average content of 40 at % or less and with a higher oxygen content near a current collector so that improved cycle performance is achieved (See Patent Document 4, for example).

Moreover, a nano-complex including Si-phase, $SiO_2$, $M_yO$ metal oxide is used to improve the first charge and discharge efficiency (See Patent Document 5, for example).

Moreover, $SiO_x$ ($0.8 \leq x \leq 1.5$) having a particle size ranging from 1 μm to 50 μm and a carbon material are mixed and calcined at a high temperature so that improved cycle performance is achieved (See Patent Document 6, for example).

Moreover, a mole ratio of oxygen to silicon in a negative electrode active material is adjusted in the range from 0.1 to 0.2 so as to hold a difference between the maximum and the minimum of the mole ratio near the interface between the active material and a current collector at 0.4 or less, so that improved cycle performance is achieved (See Patent Document 7, for example).

Moreover, a metal oxide containing lithium is used to improve the battery load characteristic (See Patent Document 8, for example).

Moreover, a hydrophobic layer such as a silane compound is formed in the surface layer of a silicon material so that improved cycle performance is achieved (See Patent Document 9, for example).

Moreover, a silicon oxide is used and coated with graphite to give conductivity so that improved cycle performance is achieved (See Patent Document 10, for example). Patent Document 10 describes that a shift value of the graphite coating, which is obtained from a Raman spectrum, has broad peaks at 1330 $cm^{-1}$ and 1580 $cm^{-1}$ and a ratio $I_{1330}/I_{1580}$ of their intensities shows $1.5 < I_{1330}/I_{1580} < 3$.

Moreover, a particle having an Si-microcrystal phase dispersing in a silicon dioxide is used to achieve higher battery capacity and improved cycle performance (See Patent Document 11, for example).

Moreover, a silicon oxide having a silicon-to-oxygen atomicity ratio of 1:y ($0 < y < 2$) is used to improve overcharge and overdischarge performance (See Patent Document 12, for example).

Finally, a mixed electrode containing silicon and carbon with a silicon content of 5 mass % to 13 mass % is produced to achieve higher battery capacity and improved cycle performance (See Patent Document 13, for example).

CITATION LIST

Patent Literature

Patent Document 1: Japanese Unexamined Patent publication (Kokai) No. 2001-185127

Patent Document 2: Japanese Unexamined Patent publication (Kokai) No. 2002-042806
Patent Document 3: Japanese Unexamined Patent publication (Kokai) No. 2006-164954
Patent Document 4: Japanese Unexamined Patent publication (Kokai) No. 2006-114454
Patent Document 5: Japanese Unexamined Patent publication (Kokai) No. 2009-070825
Patent Document 6: Japanese Unexamined Patent publication (Kokai) No. 2008-282819
Patent Document 7: Japanese Unexamined Patent publication (Kokai) No. 2008-251369
Patent Document 8: Japanese Unexamined Patent publication (Kokai) No. 2008-177346
Patent Document 9: Japanese Unexamined Patent publication (Kokai) No. 2007-234255
Patent Document 10: Japanese Unexamined Patent publication (Kokai) No. 2009-212074
Patent Document 11: Japanese Unexamined Patent publication (Kokai) No. 2009-205950
Patent Document 12: Japanese Patent No. 2997741
Patent Document 13: Japanese Unexamined Patent publication (Kokai) No. 2010-092830

SUMMARY OF INVENTION

Technical Problem

As described previously, small electronic devices, represented by mobile terminals, have been developed to improve their performance and increase their functions. Lithium-ion secondary batteries, which are used as main sources of the devices, have been required to increase the battery capacity.

The development of lithium-ion secondary batteries including negative electrodes mainly using silicon materials have been desired to solve this problem.

The lithium-ion secondary batteries using silicon materials need the same cycle performance as lithium-ion secondary batteries using carbon materials.

However, no one has yet proposed a negative electrode for this type of batteries that have the same cycle stability as the lithium-ion secondary batteries using carbon materials.

The present invention was accomplished in view of the above problems, and an object thereof is to provide a negative electrode material for a non-aqueous electrolyte secondary battery that can increase the battery capacity and improve the cycle performance and initial charge and discharge performance as well as a non-aqueous electrolyte secondary battery having a negative electrode using this negative electrode material and a method of producing negative electrode active material particles.

Solution To Problem

To achieve this object, the present invention provides a negative electrode material for a non-aqueous electrolyte secondary battery, comprising negative electrode active material particles composed of a silicon compound expressed by $SiO_x$ containing a lithium compound where the negative electrode active material particles being coated with a coating containing at least two of a substance having two or more hydroxyl groups per molecule, phosphoryl fluoride, lithium carbonate, and a hydrocarbon that exhibits a positive ion spectrum $C_yH_z$ when subjected to TOF-SIMS where $1 \leq y \leq 3$ and $2 \leq z \leq 5$.

This negative electrode material for a non-aqueous electrolyte secondary battery can inhibit the surface reaction with an electrolyte upon charging and discharging and improve the initial efficiency, which is an issue of batteries using a silicon compound. The lithium compound formed in a bulk of the silicon compound enables irreversible Li components inserted from a positive electrode to be removed, improving the battery capacity.

In addition, the inventive negative electrode material for a non-aqueous electrolyte secondary battery includes the negative electrode active material particles coated with the coating containing two or more of a substance having two or more hydroxyl groups per molecule, phosphoryl fluoride, lithium carbonate, and the hydrocarbon. In particular, the substance having two or more hydroxyl groups per molecule inhibits decomposition of cyclic carbonates contained in an electrolyte of the battery, and the phosphoryl fluoride inhibits decomposition of supporting salts contained in an electrolyte. The lithium carbonate inhibits decomposition of chain carbonates contained in an electrolyte, and the hydrocarbon efficiently inhibits decomposition of additives, especially vinylene carbonate, contained in an electrolyte. Thus, the coating of the negative electrode active material particles can efficiently inhibit the decomposition reaction of an electrolyte in the battery.

The reaction inhibition mechanism by this coating and the lithium compound contained inside the silicon compound enable stable battery cycle performance and significantly improve the initial efficiency, which is an issue of the negative electrode active material using a silicon compound.

The negative electrode active material particles are preferably further coated with a coating containing at least one of an ethylene carbonate polymer and a propylene carbonate polymer.

Such a coating can efficiently inhibit decomposition of cyclic carbonates especially.

The negative electrode active material particles are preferably further coated with a coating containing at least one of lithium fluoride and lithium oxide.

Such a coating can efficiently improve the cycle retention rate especially.

The negative electrode active material particles are preferably coated with a carbon coating.

Such a carbon coating can significantly improve the electrical conductivity. In this case, it is preferred that the above decomposition inhibition mechanism substantially coat the surface of the carbon coating.

The amount of the carbon coating preferably ranges from 0.1 mass % to 15 mass % with respect to a total amount of the negative electrode active material particles and the carbon coating.

The carbon coating in an amount of 0.1 mass % or more can sufficiently improve the conductivity. When the amount is 15 mass % or less, sufficient battery capacity can be achieved.

Carbon particles preferably adhere to surfaces of the negative electrode active material particles via a binder having a carboxyl group.

Such carbon particles enable a smooth electronic contact between the negative electrode active material particles and between the negative electrode active material particle and other active material particle (such as carbon-based active material particles).

The carbon particles adhering to the negative electrode active material particles preferably have a median size ranging from 20 nm to 200 nm.

When the median size is 20 nm or more, a sufficient electronic contact can be obtained, and the carbon particles do not adversely affect the battery performances. When the median size is 200 nm or less, many carbon particles are not required to obtain a sufficient electronic contact, and the battery can have sufficient capacity as a whole.

The binder having a carboxyl group preferably comprises at least one of carboxymethyl cellulose, a metal salt thereof, polyacrylic acid, and a metal salt thereof.

Such substances are suitable as the binder intervening between the negative electrode active material particles and the carbon particles.

The substance having two or more hydroxyl groups per molecule preferably comprises at least one of ethylene glycol and propanediol.

Such substances are particularly suitable as the substance having two or more hydroxyl groups per molecule used in the present invention. These substances can more greatly inhibit decomposition of cyclic carbonates contained in an electrolyte of the battery.

At least one of $Li_2SiO_3$, $Li_6Si_2O_7$, and $Li_4SiO_4$ is preferably contained inside the silicon compound as the lithium compound contained in the silicon compound.

In this silicon compound, a $SiO_2$ component part to be destabilized with insertion and extraction of lithium is previously modified into a lithium compound. Thus, such a compound can reduce irreversible capacity generated at charging. Consequently, high charge and discharge efficiency can be achieved, as well as bulk stability can be improved. The above lithium compounds can be obtained by, for example, modifying the silicon compound in an electrochemical manner.

It is preferred that the silicon compound exhibit a diffraction peak having a half width ($2\theta$) of $1.2°$ or more, the diffraction peak being attributable to a (111) crystal plane and obtained when X-ray diffraction is performed on the silicon compound, and a crystallite size attributable to the crystal plane be 7.5 nm or less.

Such a material contains less Si-crystal nuclei, and thus good battery performances can be achieved.

The negative electrode active material particles preferably have a median size ranging from 0.5 μm to 20 μm.

When the median size is 0.5 μm or more, sub-reaction on the surface of the negative electrode active material particles can be inhibited. When the median size is 20 μm or less, the negative electrode active material particles are prevented from breaking because of less volume change at charging and discharging.

Furthermore, the present invention provides a negative electrode for a non-aqueous electrolyte secondary battery, comprising the inventive negative electrode material, wherein an amount of the silicon compound is 4 mass % or more with respect to a total amount of a negative electrode active material in the negative electrode for a non-aqueous electrolyte secondary battery.

This negative electrode can significantly increase the battery capacity.

The negative electrode for a non-aqueous electrolyte secondary battery preferably further comprises a carbon nanotube.

The carbon nanotube (CNT) is suited to achieve an electric contact between a carbon-based active material and a silicon-based active material having high expansion and contraction rates, enabling the negative electrode to have good conductivity.

A layer of the negative electrode active material preferably contains carboxymethyl cellulose or a metal salt thereof, polyacrylic acid or a metal salt thereof, and styrene-butadiene rubber as binders.

When such binders are contained, the inventive negative electrode active material for a non-aqueous electrolyte secondary battery can be stably used.

Furthermore, the present invention provides a non-aqueous electrolyte secondary battery comprising a positive electrode containing a positive electrode active material, the inventive negative electrode, and a non-aqueous electrolyte containing a non-aqueous solvent, a supporting salt, and an additive.

In this battery, the decomposition reaction of the non-aqueous electrolyte is efficiently inhibited by the inventive negative electrode material for a non-aqueous electrolyte secondary battery. Thus, this non-aqueous electrolyte secondary battery has high capacity and good cycle performance and initial charge and discharge performance.

The non-aqueous electrolyte may contain either or both of a chain carbonate and a cyclic carbonate as the non-aqueous solvent.

In the non-aqueous electrolyte of the inventive non-aqueous electrolyte secondary battery, especially the decomposition reaction of chain carbonates and cyclic carbonates are effectively inhibited.

Furthermore, the present invention provides a method of producing negative electrode active material particles contained in a negative electrode material for a non-aqueous electrolyte secondary battery, the method comprising: producing a silicon compound expressed by $SiO_x$ where $0.5 \leq x \leq 1.6$; inserting lithium into the silicon compound and thereby forming a lithium compound in the silicon compound to modify the silicon compound; coating the silicon compound with a coating containing at least two of a substance having two or more hydroxyl groups per molecule, phosphoryl fluoride, lithium carbonate, and a hydrocarbon that exhibits a positive ion spectrum $C_yH_z$ when subjected to TOF-SIMS where $1 \leq y \leq 3$ and $2 \leq z \leq 5$, whereby the negative electrode active material particles are produced.

The method of producing negative electrode active material particles including such steps can produce the negative electrode active material particles contained in the inventive negative electrode material for a non-aqueous electrolyte secondary battery, which contain the lithium compound obtained by previously modifying the $SiO_2$ component part and are coated with the coating containing at least two of a substance having two or more hydroxyl groups per molecule, phosphoryl fluoride, lithium carbonate, and a hydrocarbon that exhibits a positive ion spectrum $C_yH_z$ ($1 \leq y \leq 3$ and $2 \leq z \leq 5$) when subjected to TOF-SIMS.

Modifying the silicon compound and coating the silicon compound with the coating may be simultaneously performed in an electrochemical manner.

The electrochemical manner to simultaneously modify and coat the silicon compound yields a stable lithium compound and a coating layer efficiently.

Advantageous Effects of Invention

In the silicon compound of the negative electrode active material particles of the inventive negative electrode material for a non-aqueous electrolyte secondary battery, the $SiO_2$ component part, which is destabilized with insertion and extraction of lithium, is previously modified into a lithium compound. Thus, this negative electrode material can reduce irreversible capacity generated at charging. Moreover, the negative electrode active material particles are coated with the coating containing at least two of a substance having two or more hydroxyl groups per molecule, phosphoryl fluoride, lithium carbonate, and a hydrocarbon that exhibits a positive ion spectrum $C_yH_z$ ($1 \leq y \leq 3$ and $2 \leq z \leq 5$) when subjected to TOF-SIMS. This coating can inhibit the decomposition reaction of a non-aqueous electrolyte on the surface of the negative electrode material, thus enabling stable battery performances and high initial efficiency.

The negative electrode for a non-aqueous electrolyte secondary battery and a non-aqueous electrolyte secondary battery using this negative electrode can also improve the battery capacity, cycle performance, and first charge and discharge performance, for the same reasons. In addition, electronic devices, machine tools, electric vehicles, and power storage systems, etc., using the inventive non-aqueous electrolyte secondary battery can achieve the same effect.

DESCRIPTION OF EMBODIMENTS

Hereinafter, embodiments of the present invention will be described in detail, but the present invention is not limited thereto.

As described previously, use of a negative electrode mainly made of a silicon material, for use in a lithium-ion secondary battery, has been considered to increase the capacity of the lithium-ion secondary battery.

The lithium-ion secondary battery using a silicon material is required to have the same cycle performance as a lithium-ion secondary battery using a carbon material; however, no one has yet proposed a negative electrode for this type of battery having the same cycle stability as a lithium-ion secondary battery using a carbon material.

In view of this, the present inventors diligently conducted study on a negative electrode active material that allows a lithium-ion secondary battery using a negative electrode containing this material to have good cycle performance, bringing the present invention to completion.

The inventive negative electrode material for a non-aqueous electrolyte secondary battery contains negative electrode active material particles composed of a silicon compound ($SiO_x$ where $0.5 \leq x \leq 1.6$) containing a lithium compound. The negative electrode active material particles are coated with a coating containing at least two of a substance having two or more hydroxyl groups per molecule, phosphoryl fluoride, lithium carbonate, and a hydrocarbon that exhibits a positive ion spectrum $C_yH_z$ ($1 \leq y \leq 3$ and $2 \leq z \leq 5$) when subjected to TOF-SIMS. TOF-SIMS stands for Time-of-Flight Secondary Ion Mass Spectrometry.

<1. Negative Electrode for Non-Aqueous Electrolyte Secondary Battery>

Figure 1:
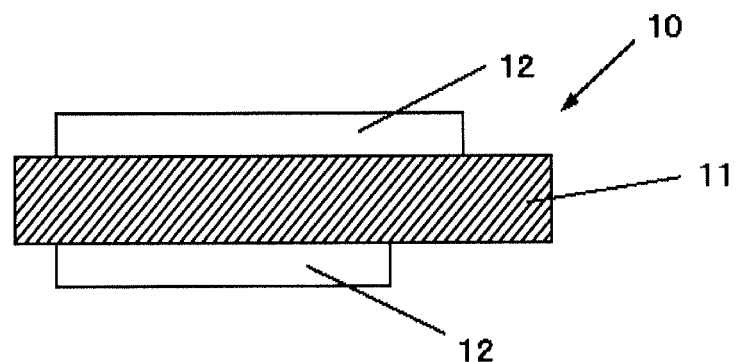
FIG. 1 is a cross-sectional view showing an exemplary configuration of the inventive negative electrode for a non-aqueous electrolyte secondary battery.

A negative electrode, for use in a non-aqueous electrolyte secondary battery, using the inventive negative electrode material for a non-aqueous electrolyte secondary battery will be described. FIG. 1 is a cross-sectional view of a configuration of a negative electrode for a non-aqueous electrolyte secondary battery (also referred to as a "negative electrode" below) according to an embodiment of the invention.

[Configuration of Negative Electrode]

As shown in FIG. 1, the negative electrode 10 has a negative electrode active material layer 12 on a negative electrode current collector 11. The negative electrode active material layer 12 may be disposed on one side or both sides of the negative electrode current collector 11. The negative electrode current collector 11 is not necessarily needed in the inventive negative electrode for a non-aqueous electrolyte secondary battery.

[Negative Electrode Current Collector]

The negative electrode current collector 11 is made of a highly conductive and mechanically strong material. Examples of the conductive material usable for the negative electrode current collector 11 include copper (Cu) and nickel (Ni). Such conductive materials preferably have inability to form an intermetallic compound with lithium (Li).

The negative electrode current collector 11 preferably contains carbon (C) and sulfur (S) besides the main element. The reason is that these elements improve the physical strength of the negative electrode current collector. In particular, when the active material layer contains a material expandable at charging, the current collector containing the above elements can inhibit deformation of the electrodes and the current collector itself. The amount of the contained elements is preferably, but not particularly limited to, 100 ppm or less. This amount enables effective inhibition of the deformation.

The surface of the negative electrode current collector 11 may or may not be roughed. Examples of the negative electrode current collector roughened include a metallic foil subjected to an electrolyzing process, an embossing process, or a chemical etching process. Examples of the negative electrode current collector that is not roughened include a rolled metallic foil.

[Negative Electrode Active Material Layer]

The negative electrode active material layer 12 contains particulate negative electrode materials that can occlude and emit lithium ions and a binder (a negative electrode binder) and may further contain other materials such as a conductive additive depending on battery design.

The negative electrode active material particles contained in the inventive negative electrode material are composed of a silicon compound ($SiO_x$ where $0.5 \leq x \leq 1.6$) at least partially coated with a coating containing two or more of a substance having two or more hydroxyl groups per molecule, phosphoryl fluoride, lithium carbonate, and a hydrocarbon that exhibits a positive ion spectrum $C_yH_z$ ($1 \leq y \leq 3$ and $2 \leq z \leq 5$) when the hydrocarbon is subjected to TOF-SIMS. The silicon compound contains a lithium compound.

In the present invention, the substance having two or more hydroxyl groups per molecule preferably includes at least one of ethylene glycol and propanediol. Such substances are particularly suitable as the substance having two or more hydroxyl groups per molecule used in the present invention. These substances can more greatly inhibit decomposition of cyclic carbonates contained in an electrolyte of the battery.

The negative electrode active material particle at least including the silicon compound coated with the coating preferably has the following structure: the negative electrode active material particle is coated with a carbon coating having conductivity, and the carbon coating is coated with the coating containing at least two of the substance having two or more hydroxyl groups per molecule, phosphoryl fluoride, lithium carbonate, and the hydrocarbon that exhibits the positive ion spectrum $C_yH_z$ ($1 \leq y \leq 3$ and $2 \leq z \leq 5$) when subjected to TOF-SIMS.

The amount of the carbon coating preferably ranges from 0.1 mass % to 15 mass % with respect to the total amount of the negative electrode active material particles and the carbon coating. The carbon coating in an amount of 0.1 mass % or more can sufficiently improve the conductivity. When the amount is 15 mass % or less, sufficient battery capacity can be obtained.

As described above, the negative electrode active material particles in the present invention can occlude and emit lithium ions. The negative electrode active material particles may have on their surface a carbon coating with conductivity as well as the coating (hereinafter, also referred to as a "decomposition reaction inhibition coating"), which has an effect of inhibiting the decomposition reaction, containing at least two of the substance having two or more hydroxyl groups per molecule, phosphoryl fluoride, lithium carbonate, and the hydrocarbon that exhibits the positive ion spectrum $C_yH_z$ ($1 \leq y \leq 3$ and $2 \leq z \leq 5$) when subjected to TOF-SIMS. In this case, lithium ions may be occluded and emitted also in at least a part of the carbon coating. The carbon coating and the decomposition reaction inhibition coating are effective in either form of an island form or a film form. The coating method of the carbon coating is preferably, but not particularly limited to, sugar carbonization or pyrolysis of hydrocarbon gas, for these methods can improve the coverage of the carbon coating.

The silicon compound used in the inventive negative electrode is silicon oxide ($SiO_x$, where $0.5 \leq x \leq 1.6$). A preferable composition thereof is that x is close to 1, which provides better cycle performance. The present invention does not necessarily intend a silicon material composition of 100% but permits a silicon material containing a minute amount of impurities.

The negative electrode active material particles are preferably further coated with a coating containing at least one of an ethylene carbonate polymer and a propylene carbonate polymer. This coating can be obtained, for example, by controlling potential, current, and discharge process in an electrochemical manner. When the negative electrode active material particles are further coated with this coating, which serves as a decomposition reaction inhibition coating, decomposition of especially cyclic carbonates can be more efficiently inhibited.

The negative electrode active material particles are preferably further coated with a coating containing at least one of lithium fluoride and lithium oxide. Such a coating provides more stable cycle performance and battery performances.

It is preferred that these decomposition reaction inhibition coatings be substantially formed on the carbon coating.

Moreover, carbon particles preferably adhere to surfaces of the negative electrode active material particles with a binder having a carboxyl group. In particular, the carbon particles are preferably attached to the surface of the carbon coating that coats the negative electrode active material particles of the inventive negative electrode material; the binder having a carboxyl group enables the carbon coating to be firmly attached. This facilitates an electronic contact between the particles and makes the battery performances stable.

The carbon particles preferably have a median size ranging from 20 nm to 200 nm. When the median size is 20 nm or more, a sufficient electronic contact can be obtained, and the carbon particles do not adversely affect the battery performances. When the median size is 200 nm or less, many carbon particles are not required to obtain a sufficient electronic contact, and the battery can have sufficient capacity as a whole.

The binder having a carboxyl group for attaching the carbon particles to the negative electrode active material particles preferably includes at least one of carboxymethyl cellulose, a metal salt thereof, polyacrylic acid, and a metal salt thereof. When such substances intervene between the negative electrode active material particles and the carbon particles, the carbon particles can be firmly attached to the surfaces of the negative electrode active material particles.

The negative electrode active material particles used in the inventive negative electrode material are composed of the silicon compound containing a lithium compound. This silicon compound can be obtained by selectively modifying a part of the $SiO_2$ components formed therein into a lithium compound. Above all, $Li_4SiO_4$, $Li_2SiO_3$, and $Li_6Si_2O_7$ have especially good characteristics. These selective compounds can be formed by potential control or current control relative to a lithium counter electrode under various conditions.

The lithium compound can be quantified by NMR (Nuclear Magnetic Resonance) and XPS (X-ray Photoelectron Spectroscopy). XPS and NMR measurements can be performed, for example, under the following conditions.

XPS

Apparatus: an X-ray photoelectron spectroscopy apparatus

X-ray Source: a monochromatic Al—Kα ray

X-ray Spot Diameter: 100 μm

Ar-ion Sputtering Gun Conditions: 0.5 kV, 2 mm×2 mm $^{29}$Si-MAS-NMR

Apparatus: a 700-NMR spectroscope made by Bruker Corp.

Probe: a 4-mm-HR-MAS rotor, 50 μL

Sample Rotation Speed: 10 kHz

Temperature of Measurement Environment: 25° C.

The production of the selective compound, i.e., the modification of the silicon compound is preferably performed in an electrochemical manner.

Such electrochemical modification (bulk modification) to produce the negative electrode active material particles enables reduction or prevention of the lithium compound formation in an Si region, stabilizing the material in the air, water slurry, or solvent slurry. Moreover, electrochemical modification can produce a more stable substance than does thermal modification (thermal doping method), in which the compound is randomly modified.

$Li_4SiO_4$, $Li_2SiO_3$, and $Li_6Si_2O_7$ can improve the performance when at least one of them is formed within a bulk of the silicon-based active material, and a combination of two or more of them can further improve the performance.

When the negative electrode active material particles are coated with the decomposition reaction inhibition coating like the present invention, powder storage property is dramatically improved. The most preferable method for forming the decomposition reaction inhibition coating is an electrochemical method, though not particularly limited thereto.

A lower crystallinity of the silicon compound contained in the inventive negative electrode material is better. More specifically, the silicon compound preferably exhibits a diffraction peak having a half width (2θ) of 1.2° or more that is attributable to an Si(111) crystal plane and obtained by X-ray diffraction, and a crystallite size attributable to the crystal plane is 7.5 nm or less. Use of the silicon compound with low crystallinity, which has a few Si crystal, can improve the battery performances and allows production of a stable lithium compound.

Moreover, the inventive negative electrode for a non-aqueous electrolyte secondary battery may mix a carbon active material with the inventive negative electrode material, depending on use.

In the present invention, the amount (percentage) of the silicon compound is preferably 4 mass % or more with respect to the total amount of the negative electrode active material in the negative electrode for a non-aqueous electrolyte secondary battery. Even when the amount is substantially 100%, sufficient battery capacity can be achieved since the battery capacity can be improved, considering the discharge curve, negative electrode capacity, initial efficiency, and thickness expansion.

The median size of the negative electrode active material particles preferably ranges, but not particularly limited to, from 0.5 μm to 20 μm. This range makes it easy to occlude and emit lithium ions and inhibits the breakage of the particles at charging and discharging. A median size of 0.5 μm or more then prevents the particle surface from increasing and can thus reduce the battery irreversible capacity; a median size of 20 μm or less inhibits the breakage of the negative electrode active material particles and can thus inhibit the decomposition reaction of an electrolyte.

The inventive negative electrode for a non-aqueous electrolyte secondary battery may have a negative electrode active material layer that contains carboxymethyl cellulose or a metal salt thereof, polyacrylic acid or a metal salt thereof, and styrene-butadiene rubber as binders (negative electrode binders). The metal salt of carboxymethyl cellulose may be, for example, carboxymethyl cellulose partially changed into a sodium salt. Preferable examples of the metal salt of polyacrylic acid include lithium polyacrylate and sodium polyacrylate.

Examples of negative electrode conductive additives include carbon materials such as carbon black, acetylene black, graphite, ketjen black, carbon nanotube (CNT), carbon nanofiber, and the combination thereof.

In particular, carbon nanotube is preferably contained as the negative electrode conductive additive. The carbon nanotube is suited to achieve an electric contact between the carbon material and the silicon material having high expansion and contraction rates.

The negative electrode active material layer is formed by, for example, an application method. The application method is to mix the negative electrode active material particles and the binders, in addition to the conductive additive and the carbon material as needed, and disperse the resultant mixture into an organic solvent or water to apply the resultant to a subject.

[Method of Producing Negative Electrode]

First, the method of producing the negative electrode active material particles contained in the inventive negative electrode material for a non-aqueous electrolyte secondary battery will be now described. The method begins with a production of a silicon compound expressed by $SiO_x$ (0.5≤x≤1.6). Then, lithium is inserted into the silicon compound to form a lithium compound inside the silicon compound. At this time, the silicon compound is coated with a coating containing at least two of a substance having two or more hydroxyl groups per molecule, phosphoryl fluoride, lithium carbonate, and a hydrocarbon that exhibits the positive ion spectrum $C_yH_z$ (1≤y≤3 and 2≤z≤5) when subjected to TOF-SIMS. The hydrocarbon can be controlled during either lithium insertion or carbon coating production, although depending on how a material thereof is produced.

More specifically, the negative electrode active material particles can be produced by, for example, the following procedure.

A raw material capable of generating a silicon oxide gas is first heated under an inert gas atmosphere or reduced pressure at a temperature ranging from 900° C. to 1600° C. to generate the silicon oxide gas. The raw material is a mixture of metallic silicon powder and silicon dioxide powder. The mole ratio of the mixture preferably satisfies the relation of 0.8<metallic silicon powder/silicon dioxide powder<1.3, in consideration of the existence of oxygen on the metallic silicon powder surface and a minute amount of oxygen in a reactor. The Si-crystallites in the particles are controlled by adjustment of an arrangement range (mixture mole ratio) and a vaporization temperature, or heat treatment after the production. The generated gas is deposited on an adsorption plate. The temperature in the reactor is decreased to 100° C. or less and then a deposit is taken out. The deposit is pulverized with a ball mill or a jet mill to form powder.

The obtained powder material (silicon oxide powder) may be coated with a carbon coating although this step is not essential. This step is effective in improving the battery performances.

Thermal CVD is desirably used to coat the obtained powder material with the carbon coating. This thermal CVD is to fill a furnace in which the silicon compound is placed with a hydrocarbon gas and heat the interior of the furnace. The hydrocarbon gas is thereby decomposed, and the carbon coating is formed on the powder material. The pyrolysis temperature is preferably, but not particularly limited to, 1200° C. or less, more preferably 950° C. or less. This temperature range enables the inhibition of an unintended disproportionation of the active material particles. The hydrocarbon gas preferably has a composition of $C_nH_m$ where 3≤n, though not particularly limited thereto, for this composition enables reduction in production cost and improvement in physical properties of a pyrolysis product.

Figure 2:
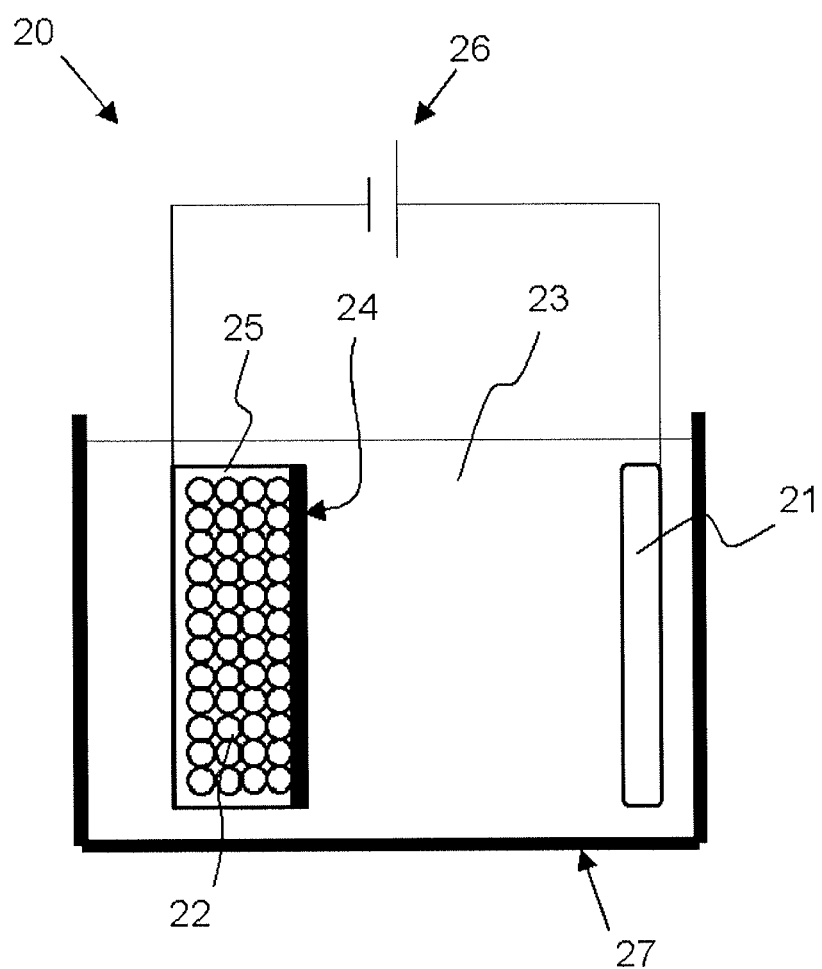
FIG. 2 shows a bulk modification apparatus used in production of a negative electrode active material contained in the inventive negative electrode for a non-aqueous electrolyte secondary battery.

The bulk modification is preferably performed by inserting and extracting lithium in an electrochemical manner. Although apparatus structure is not particularly limited, bulk modification can be performed with, for example, a bulk modification apparatus 20 shown in FIG. 2. The bulk modification apparatus 20 includes a bath 27 filled with an organic solvent 23, a positive electrode 21 (lithium source, or modification source) provided within the bath 27 and connected to one terminal of a power source 26, a powder storage container 25 provided within the bath 27 and connected to the other terminal of the power source 26, and a separator 24 provided between the positive electrode 21 and the powder storage container 25. In the powder storage container 25, silicon oxide powder 22 is stored.

Simultaneously with the modification in the bulk modification apparatus 20, the silicon oxide powder 22 can be coated with the coating containing at least two of the substance having two or more hydroxyl groups per molecule, phosphoryl fluoride, lithium carbonate, and the hydrocarbon that exhibits the positive ion spectrum $C_yH_z$ (1≤y≤3 and 2≤z≤5) when subjected to TOF-SIMS.

As described previously, the modified particles (the negative electrode active material particles) thus obtained may contain no carbon coating. However, when more uniform control is required in the bulk modification treatment, electrical potential distribution needs to be reduced, and thus the carbon coating is desirably contained.

Examples of the organic solvent 23 in the bath 27 include ethylene carbonate, propylene carbonate, dimethyl carbonate, diethyl carbonate, ethylmethyl carbonate, fluoromethylmethyl carbonate, and difluoromethylmethyl carbonate. Examples of an electrolyte salt contained in the organic solvent 23 include lithium hexafluorophosphate ($LiPF_6$) and lithium tetrafluoroborate ($LiBF_4$).

The positive electrode 21 may use a lithium foil or a Li-containing compound. Examples of the Li-containing compound include lithium carbonate, lithium oxide, lithium cobaltate, olivine iron lithium, lithium nickelate, and lithium vanadium phosphate.

Subsequently, the silicon-based active material and a carbon-based active material are mixed if necessary, and the negative electrode active material particles are mixed with a binder (a negative electrode binder) and other materials such as conductive additives. The resultant negative electrode mixture is then mixed with an organic solvent, water or the like to form slurry.

In the present invention, the binder may be composed of three substances, namely, carboxymethyl cellulose or a metal salt thereof and polyacrylic acid or a metal salt thereof added to styrene-butadiene rubber.

The negative electrode mixture slurry is then applied to the surface of the negative electrode current collector 11 and dried to form a negative electrode active material layer 12 shown in FIG. 1. At this time, heating press may be performed, if necessary.

<2. Lithium-Ion Secondary Battery>

A lithium-ion secondary battery will now be described for an illustrative example of the non-aqueous electrolyte secondary battery using the inventive negative electrode.

[Configuration of Laminate Film Secondary Battery]

Figure 3:
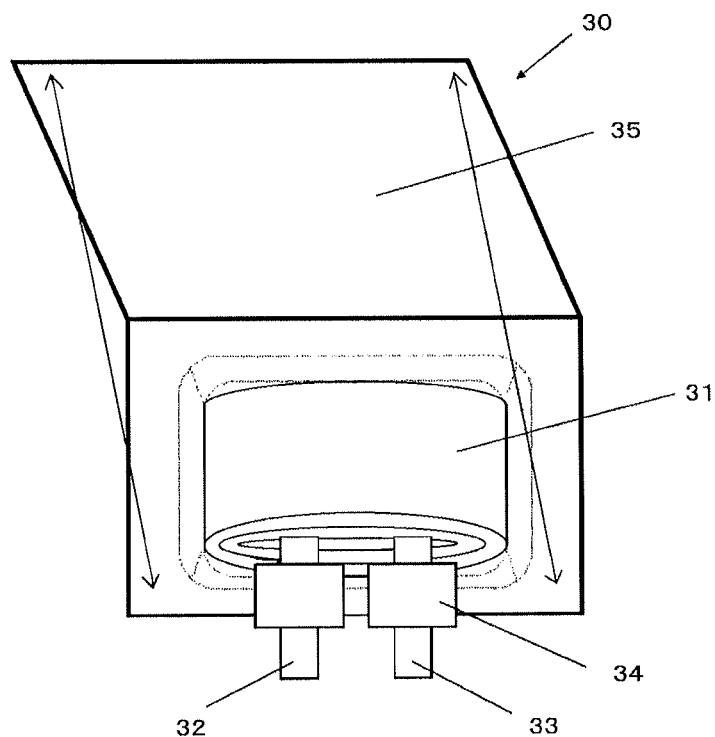
FIG. 3 is a diagram showing an exemplary configuration of a lithium secondary battery of laminate film type containing the inventive negative electrode for a non-aqueous electrolyte secondary battery.

The laminate film secondary battery 30 shown in FIG. 3 includes a wound electrode body 31 interposed between sheet-shaped outer parts 35. The wound electrode body 31 are formed by winding a positive electrode, a negative electrode, and a separator disposed between these electrodes. The electrode body may also be composed of a laminated part of the positive and negative electrodes, and a separator disposed between these electrodes. The electrode bodies of both types have a positive electrode lead 32 attached to the positive electrode and a negative electrode lead 33 attached to the negative electrode. The outermost circumference of the electrode body is protected by a protecting tape.

The positive and negative leads 32, 33, for example, extend from the interior of the outer parts 35 toward the exterior in one direction. The positive electrode lead 32 is made of, for example, a conductive material such as aluminum; the negative electrode lead 33 is made of, for example, a conductive material such as nickel or copper.

An example of the outer part 35 is a laminate film composed of a fusion-bond layer, a metallic layer, and a surface protecting layer stacked in this order. Two laminate films are fusion-bonded or stuck with an adhesive at the outer edges of their fusion-bond layers such that each fusion-bond layer faces the electrode body 31. The fusion-bond layer may be, for example, a film such as a polyethylene or polypropylene film; the metallic layer aluminum foil; the protecting layer nylon.

The space between the outer parts 35 and the positive and negative electrodes is filled with close adhesion films 34 to prevent air from entering therein. Exemplary materials of the close adhesion films include polyethylene, polypropylene, and polyolefin.

[Positive Electrode]

The positive electrode has a positive electrode active material layer disposed on one side or both sides of a positive electrode current collector as in the negative electrode 10, for example, shown in FIG. 1.

The positive electrode current collector is made of, for example, a conductive material such as aluminum.

The positive electrode active material layer contains a positive electrode material that can occlude and emit lithium ions or a combination thereof, and may contain a positive electrode binder, a positive electrode conductive additive, a dispersing agent, or other materials according to design. The same detailed description as described for the negative electrode binders and negative electrode conductive additive, for example, is then given for the positive electrode binder and the positive electrode conductive additive.

The positive electrode material is preferably a compound containing lithium. Examples of this compound include a complex oxide composed of lithium and transition metal elements, and a phosphoric acid compound containing lithium and transition metal elements. Among them, a compound containing at least one of nickel, iron, manganese, and cobalt is preferable for the positive electrode material. The chemical formula of this compound is expressed by, for example, $Li_xM_1O_2$ or $Li_yM_2PO_4$, where $M_1$ and $M_2$ represent at least one kind of transition metal elements, and x and y represent a value varied depending on a charging or discharging status of a battery, which typically satisfy $0.05 \le x \le 1.10$ and $0.05 \le y \le 1.10$.

Examples of the complex oxide composed of lithium and transition metal elements include a lithium cobalt complex oxide ($Li_xCoO_2$), a lithium nickel complex oxide ($Li_xNiO_2$), and a lithium nickel cobalt complex oxide. Examples of the lithium nickel cobalt complex oxide include a lithium nickel cobalt aluminum complex oxide (NCA) or a lithium nickel cobalt manganese complex oxide (NCM).

Examples of the phosphoric acid compound composed of lithium and transition metal elements include a lithium iron phosphoric acid compound ($LiFePO_4$), a lithium iron manganese phosphoric acid compound ($LiFe_{1-u}Mn_uPO_4$ ($0<u<1$)). Use of these positive electrode materials enables a higher battery capacity and excellent cycle performance.

[Negative Electrode]

The negative electrode is configured as in the above negative electrode 10 for a lithium-ion secondary battery shown in FIG. 1, and, for example, has the negative electrode active material layer disposed on both faces of the current collector. The negative electrode preferably has a negative-electrode charge capacity larger than a battery charge capacity (electrical capacitance) provided by the positive electrode active material. This negative electrode itself can inhibit the precipitation of lithium metal.

The positive electrode active material layer is formed partially on both faces of the positive electrode current collector. The same is true of the negative electrode active material layer. Such a negative electrode may have, for example, an area at which the positive electrode active material layer is not present on the surface of the positive electrode current collector that the negative electrode active material layer faces. This area permits stable battery design.

This non-facing area, i.e., the area at which the positive and negative electrode active material layers do not face one another is hardly affected by charging and discharging. The status of the negative electrode active material layer is consequently maintained since its formation. This enables repeatable investigation of the composition of negative electrode active material with high precision without being affected by charging and discharging.

[Separator]

The separator separates the positive electrode and the negative electrode, prevents short circuit current due to contact of these electrodes, and passes lithium ions therethrough. This separator may be made of, for example, a porous film of synthetic resin or ceramics, or two or more stacked porous films. Examples of the synthetic resin include polytetrafluoroethylene, polypropylene, and polyethylene.

[Electrolyte]

At least a part of the active material layers or the separator is impregnated with a liquid electrolyte (an electrolyte solution). The electrolyte is composed of an electrolyte salt (a supporting salt) dissolved in a solvent and may contain other materials such as additives.

The solvent may be, for example, a non-aqueous solvent. Examples of the non-aqueous solvent include ethylene carbonate, propylene carbonate, butylene carbonate, dimethyl carbonate, diethyl carbonate, ethylmethyl carbonate, carbonic acid propylmethyl ester, 1,2-dimethoxyethane, and tetrahydrofuran. Among them, ethylene carbonate, propylene carbonate, dimethyl carbonate, diethyl carbonate, or ethylmethyl carbonate, or the combination thereof is preferable. Such solvent enables better performances. The combination of a viscous solvent, such as ethylene carbonate or propylene carbonate, and a non-viscous solvent, such as dimethyl carbonate, diethyl carbonate or ethylmethyl carbonate allows much better performances, for such a solvent improves the dissociation of electrolyte salt and ionic mobility.

For an alloyed electrode, the solvent preferably contains at least one of a halogenated chain carbonic acid ester and a halogenated cyclic carbonic acid ester. Such a solvent enables the negative electrode active material to be coated with a stable coating at discharging and particularly charging. The halogenated chain carbonic acid ester is a chain carbonic acid ester containing halogen, in which at least one hydrogen atom is substituted with halogen. The halogenated cyclic carbonic acid ester is a cyclic carbonic acid ester containing halogen, in which at least one hydrogen atom is substituted with halogen.

The halogen is preferably, but not particularly limited to, fluorine, for fluorine enables the formation of better coating than other halogens do. A larger number of halogens is better, for a more stable coating can be obtained, thus reducing the decomposition reaction of an electrolyte.

Examples of the halogenated chain carbonic acid ester include carbonic acid fluoromethylmethyl ester and carbonic acid methyl(difluoromethyl) ester. Examples of the halogenated cyclic carbonic acid ester include 4-fluoro-1,3-dioxolan-2-one and 4,5-difluoro-1,3-dioxolan-2-one.

The solvent preferably contains an unsaturated carbon bond cyclic carbonate as an additive, for this enables the formation of a stable coating on a negative electrode at charging and discharging and the inhibition of the decomposition reaction of an electrolyte. Examples of the unsaturated carbon bond cyclic carbonate include vinylene carbonate and vinyl ethylene carbonate.

In addition, the solvent preferably contains sultone (cyclic sulfonic acid ester) as an additive, for this enables improvement in chemical stability of a battery. Examples of the sultone include propane sultone and propene sultone.

In addition, the solvent preferably contains acid anhydride, for this enables improvement in chemical stability of the electrolyte. The acid anhydride may be, for example, propane disulfonic acid anhydride.

The supporting salt (the electrolyte salt) may contain, for example, at least one light metal salt such as lithium salt. Examples of the lithium salt include lithium hexafluorophosphate ($LiPF_6$), and lithium tetrafluoroborate ($LiBF_4$).

The content of the supporting salt in the solvent preferably ranges from 0.5 mol/kg to 2.5 mol/kg. This content enables high ionic conductivity.

[Manufacture of Laminate Film Secondary Battery]

Firstly, a positive electrode is produced with the above positive electrode material as follows. A positive electrode mixture is created by mixing the positive electrode material with as necessary the positive electrode binder, the positive electrode conductive additive, and other materials, and dispersed in an organic solvent to form slurry of the positive electrode mixture. This slurry is then applied to a positive electrode current collector with a coating apparatus such as a die coater having a knife roll or a die head, and dried by hot air to obtain a positive electrode active material layer. The positive electrode active material layer is finally compressed with, for example, a roll press. The compression may be performed under heating. The compression may be repeated multiple times.

Secondly, a negative electrode active material layer is formed on a negative electrode current collector to produce a negative electrode through the same procedure as in the above production of the negative electrode 10 for a lithium-ion secondary battery.

When the positive electrode and the negative electrode are produced, the active material layers are formed on both faces of the positive and negative electrode current collectors. In both the electrodes, the length of the active material layers formed on the faces may differ from one another (See FIG. 1).

Finally, the following steps are carried out in the order described. An electrolyte is prepared. With ultrasonic welding, the positive electrode lead 32 is attached to the positive electrode current collector and the negative electrode lead 33 is attached to the negative electrode current collector. The positive and negative electrodes and the separator interposed therebetween are stacked or wound to produce the wound electrode body 31, and a protecting tape is stuck to the outermost circumference of the body. The electrode body is flattened. The film-shaped outer part 35 is folded in half to interpose the electrode body therebetween. The outer edges of the half parts are stuck one another by heat sealing such that one of the four sides is opened to house the electrode body. The close adhesion films are inserted between the outer part and the positive and negative electrode leads. The prepared electrolyte is introduced from the open side in a prescribed amount to perform the impregnation of the electrolyte under a vacuum. The open side is stuck by vacuum heat sealing.

In this manner, the laminate film secondary battery 30 can be produced.

In the inventive non-aqueous electrolyte secondary battery such as the laminate film secondary battery 30 produced above, the utilization factor of the negative electrode is preferably 93% or more and 99% or less.

The battery having a negative electrode utilization factor of 93% or more prevents reduction in the first charge efficiency and greatly improves the battery capacity; one having a negative electrode utilization factor of 99% or less prevents the precipitation of lithium, thereby ensuring safety.

EXAMPLE

The present invention will be more specifically described below with reference to examples and comparative examples, but the present invention is not restricted to these examples.

Example 1-1

A laminate film secondary battery 30 shown in FIG. 3 was produced by the following procedure.

The procedure began with the production of a positive electrode. Positive electrode active materials of 95 mass parts of lithium cobaltate ($LiCoO_2$), 2.5 mass parts of positive electrode conductive additive, and 2.5 mass parts of positive electrode binder (polyvinylidene fluoride, PVDF) were mixed to produce a positive electrode mixture. The positive electrode mixture was dispersed in an organic solvent (N-methyl-2-pyrrolidone, NMP) to form paste slurry. The slurry was applied to both faces of a positive electrode current collector with a coating apparatus having a die head and dried with a drying apparatus of hot-air type. The positive electrode current collector had a thickness of 15 μm. The resultant was finally compressed with a roll press.

Next, a negative electrode was produced as described below.

The negative electrode active material particles contained in the inventive negative electrode were produced by the following procedure.

Firstly, a mixed raw material (a material to be vaporized) of metallic silicon and silicon dioxide was placed in a reactor and evaporated under a vacuum of 10 Pa to deposit the evaporated material on an adsorption plate. The deposit was sufficiently cooled and then taken out to pulverize the deposit with a ball mill. After adjusting the particle size of the obtained powder, the powder was coated with a carbon coating by thermal CVD. The produced powder was bulk-modified by an electrochemical method in a mixed solvent having an ethylene-carbonate-to-dimethyl-carbonate volume ratio of 3:7, including 1.3 mol/kg of an electrolyte salt, $LiPF_6$. The negative electrode active material particles were thus produced.

The negative electrode active material particles contained $Li_2SiO_3$ and $Li_4SiO_4$ in their interior. Moreover, the negative electrode active material particles were coated with a coating containing ethylene glycol as a substance having two or more hydroxyl groups per molecule, phosphoryl fluoride, lithium carbonate, and hydrocarbons that exhibit positive ion spectra $CH_2$, $C_2H_3$, and $C_3H_5$ (all satisfy $C_yH_z$ where $1 \leq y \leq 3$ and $2 \leq z \leq 5$) when subjected to TOF-SIMS.

The negative electrode active material particles were then optionally mixed with a carbon-based active material, namely, natural graphite (and synthetic graphite, hard carbon, and soft carbon, as needed) with a prescribed weight ratio to produce a negative electrode material.

The produced negative electrode material, a first conductive additive (carbon nanotube, CNT), a second conductive additive, a styrene-butadiene rubber, (a styrene-butadiene copolymer, referred to as SBR below), carboxymethyl cellulose (referred to as CMC below), and polyacrylic acid (referred to as PAA below) were mixed at a dry-weight ratio of 90:1.25:1.25:2.5:4:1. The mixture was diluted with pure water to form slurry of a negative-electrode mixture. The above SBR, CMC, and PAA were used as negative electrode binders.

As a negative electrode current collector, an electrolytic copper foil having a thickness of 15 μm was used. The negative electrode mixture slurry was finally applied to the negative electrode current collector and dried under a vacuum at 100° C. for 1 hour. The accumulation amount of the negative electrode active material layer per unit area on one surface of the negative electrode was 5 mg/cm².

The polyacrylic acid used in the present example preferably has a molecular weight ranging from 250,000 to 1,250,000, more preferably 1,000,000 (for example, a product available from Wako Pure Chemical Industries Ltd., can be used.) although not limited thereto.

Then, a solvent was produced by mixing 4-fluoro-1,3-dioxolan-2-one (FEC), ethylene carbonate (EC), and dimethyl carbonate (DMC). An electrolyte salt (lithium hexafluorophosphate, $LiPF_6$) was dissolved therein to produce an electrolyte. The composite of the solvent was FEC:EC:DMC=10:20:70 in term of the volume. The content of the electrolyte salt in the solvent was 1.3 mol/kg.

The secondary battery was assembled by the following procedure. An aluminum lead was first ultrasonic-welded to one end of the positive electrode current collector. A nickel lead was welded to one end of the negative electrode current collector. The positive electrode, a separator, the negative electrode, a separator were then stacked in this order and wound in a longitudinal direction to obtain a wound electrode body. The end of the wound part was fixed by a PET protecting tape. The separators were a 12-μm laminate film composed of a porous polyethylene film interposed between porous polypropylene films. The electrode body was interposed between outer parts, and the outer circumferences except one side were heat-sealed to house the electrode body therein. The outer parts were an aluminum laminate film composed of a nylon film, aluminum foil, and a polypropylene film stacked. The prepared electrolyte was poured from an open side to perform the impregnation of the electrolyte under a vacuum. The open side was stuck by heat sealing.

Examples 1-2, 1-3 and Comparative Examples 1-1, 1-2

A secondary battery was produced as in example 1-1 except that oxygen amount in a bulk of the silicon compound was adjusted when the negative electrode material was produced. The amount of accumulated oxygen was adjusted by changing the temperature and the ratio of the material to be vaporized. Table 1 shows the x-value of the silicon compound expressed by $SiO_x$ in examples 1-1 to 1-3 and comparative examples 1-1, 1-2.

All negative electrode active material particles in examples 1-1 to 1-3 and comparative examples 1-1, 1-2 had the following physical properties: the negative electrode active material particles had a median size $D_{50}$ of 4 μm; the half width (2θ) of the diffraction peak attributable to an (111) crystal plane and obtainable by X-ray diffraction was 2.593°; the crystallite size attributable to the (111) crystal plane was 3.29 nm; the negative electrode active material particles contained $Li_2SiO_3$ and $Li_4SiO_4$ in their interior; the amount of the carbon coating was 5 mass % with respect to the total amount of the negative electrode active material particles and the carbon coating.

The coating of the negative electrode active material particles contained ethylene glycol as a substance having two or more hydroxyl groups per molecule, phosphoryl fluoride, lithium carbonate, and hydrocarbons that exhibit positive ion spectra $CH_2$, $C_2H_3$, and $C_3H_5$ when subjected to TOF-SIMS.

The cycle performance and the first charge and discharge performance of the secondary batteries in examples 1-1 to 1-3 and comparative examples 1-1, 1-2 were investigated. The result is given in Table 1.

TABLE 1

D50 = 4 μm, half width 2θ = 2.593, Si(111) crystallite 3.29 nm, SBR/CMC/PAA FEC:EC:DMC(1:2:7 vol %), LiPF$_6$ 1.3 mol/kg, positive electrode LiCoO$_2$ CNT 1 wt %, Li$_2$SiO$_3$, Li$_4$SiO$_4$, carbon coating 5 wt % ethylene glycol, lithium carbonate, phosphoryl fluoride, $CH_2$, $C_2H_3$, $C_3H_5$

| Table 1 | SiO$x$ X= | Capacity retention rate (%) | Initial efficiency (%) |
|---|---|---|---|
| Comparative example 1-1 | 0.3 | 46 | 88.3 |
| Example 1-1 | 0.5 | 80 | 87.9 |
| Example 1-2 | 1 | 88 | 87.5 |
| Example 1-3 | 1.6 | 87 | 87.5 |
| Comparative example 1-2 | 1.8 | Battery was neither charged nor discharged | |

As shown in Table 1, when the oxygen amount was lack (comparative example 1-1, x=0.3), the capacity retention rate significantly degraded although the initial efficiency was improved. When the oxygen amount was excess (comparative example 1-2, x=1.8), the conductivity decreased, and thus the capacity of the SiO material was not exhibited. In the following examples, SiO$_x$ where x=1.0 was used.

Examples 2-1 to 2-5

A secondary battery was produced as in example 1-2 (x=1.0) except that the substances contained in the coating of the silicon compound powder in the negative electrode material was changed. The powder was coated with a coating containing ethylene glycol and lithium carbonate in example 2-1; propanediol and lithium carbonate in example 2-2; ethylene glycol, lithium carbonate, and phosphoryl fluoride in example 2-3; lithium carbonate and phosphoryl fluoride in example 2-4; ethylene glycol, lithium carbonate, and hydrocarbons that exhibit positive ion spectra $CH_2$, $C_2H_3$, and $C_3H_5$ when subjected to TOF-SIMS in example 2-5.

Comparative Example 2-1

A secondary battery was produced as in example 1-2 (x=1.0) except that the substances contained in the coating of the silicon compound powder in the negative electrode material was lithium carbonate alone.

All negative electrode active material particles in examples 2-1 to 2-5 and comparative example 2-1 had the following physical properties:

The negative electrode active material particles had a median size $D_{50}$ of 4 μm; the half width (2θ) of the diffraction peak attributable to an (111) crystal plane and obtainable by X-ray diffraction was 2.593°; the crystallite size attributable to the (111) crystal plane was 3.29 nm; the negative electrode active material particles contained Li$_2$SiO$_3$ and Li$_4$SiO$_4$ in their interior; the amount of the carbon coating was 5 mass % with respect to the total amount of the negative electrode active material particles and the carbon coating.

The cycle performance and the first charge and discharge performance of the secondary batteries in examples 2-1 to 2-5 and comparative example 2-1 were investigated. The result is given in Table 2.

TABLE 2

D50 = 4 μm, half width 2θ = 2.593, Si(111) crystallite 3.29 nm, SBR/CMC/PAA FEC:EC:DMC(1:2:7 vol %), LiPF$_6$ 1.3 mol/kg, positive electrode LiCoO$_2$ CNT 1 wt %, Li$_2$SiO$_3$, Li$_4$SiO$_4$, carbon coating 5 wt %

| Table 2 | Decomposition reaction inhibition coating 1 | Capacity retention rate (%) | Initial efficiency (%) |
|---|---|---|---|
| Comparative example 2-1 | Lithium carbonate | 73 | 69.0 |
| Example 2-1 | Ethylene glycol, Lithium carbonate | 80.1 | 78.0 |
| Example 2-2 | Propanediol, Lithium carbonate | 80 | 77.0 |
| Example 2-3 | Ethylene glycol, Lithium carbonate, Phosphoryl fluoride | 80.3 | 79.0 |
| Example 2-4 | Lithium carbonate, Phosphoryl fluoride | 80.2 | 76.0 |
| Example 2-5 | Ethylene glycol, Lithium carbonate, $CH_2$, $C_2H_3$, $C_3H_5$ | 80 | 79.0 |

When the powder is coated with lithium carbonate alone as in comparative example 2-1, electrochemical bulk modification is performed with a solvent of DMC and electrolyte salts of LiBF$_4$ salt and LiPF$_6$ salt to attach the lithium carbonate to the surfaces of the negative electrode active material particles. Thereafter, the residual salts can be removed, for example, by propylene carbonate. However, the surface state in comparative example 2-1 was insufficient to inhibit the decomposition reaction of the non-aqueous electrolyte of the battery. The reason is considered as follows: although the lithium carbonate could inhibit the decomposition reaction of chain carbonates, the coating containing lithium carbonate alone failed to inhibit the decomposition reaction of cyclic carbonates in the battery, which also uses cyclic carbonates as a substantial non-aqueous electrolyte (electrolyte solution).

Ethylene glycol can be easily obtained by electrochemical modification of especially ethylene carbonate. Ethylene glycol inhibits decomposition of chain carbonates in a non-aqueous electrolyte in a battery; lithium carbonate inhibits decomposition of chain carbonates. Propanediol has the same effect as ethylene glycol. Therefore, examples 2-1 and 2-2 could inhibit decomposition of not only chain carbonates but also cyclic carbonates and thus remarkably inhibit decomposition of the non-aqueous electrolyte, significantly improving the battery performances compared with comparative example 2-1.

Phosphoryl fluoride can be obtained by decomposing the electrolyte salt LiPF$_6$ used in electrochemical bulk modification. Phosphoryl fluoride can inhibit decomposition of the electrolyte salt (the supporting salt) added in the non-aqueous electrolyte. Thus, phosphoryl fluoride is not necessarily removed after production.

As shown in Table 2, example 2-3, where the coating contained phosphoryl fluoride besides ethylene glycol and lithium carbonate, could inhibit decomposition of the electrolyte salt (the supporting salt) and thus had better battery performances than examples 2-1 and 2-2.

An intended hydrocarbon that exhibits positive ion spectrum $C_yH_z$ (1≤y≤3 and 2≤z≤5) when subjected to TOF-SIMS can be obtained by changing thermal decomposition temperature and gas species in thermal CVD to form a carbon coating. Alternatively, the hydrocarbon can also be produced by decomposing, for example, vinylene carbonate used as the solvent in an electrochemical manner. Such a hydrocarbon is suitably used for the reaction inhibition coating, providing good capacity performances as shown in example 2-5. TOF-SIMS can be measured under the following condition.

Apparatus: Time-of-Flight Secondary Ion Mass Spectrometry (TOF-SIMS) made by ION-TOF GmbH
Primary Ion: $Bi^{3+}$
Ion Gun Accelerating Voltage: 25 kV
Operation Range: 250 µm×250 µm Examples 3-1 to 3-3

A secondary battery was produced basically as in example 1-2 except that the negative electrode active material particles were further coated with a coating containing at least one of an ethylene carbonate polymer and a propylene carbonate polymer. Specifically, the particles were coated with a coating containing an ethylene carbonate (EC) polymer in example 3-1; a propylene carbonate (PC) polymer in example 3-2; both an ethylene carbonate polymer and a propylene carbonate polymer in example 3-3. These coatings were formed by controlling potential, current, and discharge process in an electrochemical manner.

All negative electrode active material particles in examples 3-1 to 3-3 had the following physical properties:

The negative electrode active material particles had a median size $D_{50}$ of 4 µm; the half width (2θ) of the diffraction peak attributable to an (111) crystal plane and obtainable by X-ray diffraction was 2.593°; the crystallite size attributable to the (111) crystal plane was 3.29 nm; the negative electrode active material particles contained $Li_2SiO_3$ and $Li_4SiO_4$ in their interior; the amount of the carbon coating was 5 mass % with respect to the total amount of the negative electrode active material particles and the carbon coating.

The coating of the negative electrode active material particles contained ethylene glycol as a substance having two or more hydroxyl groups per molecule, phosphoryl fluoride, lithium carbonate, and hydrocarbons that exhibit positive ion spectra $CH_2$, $C_2H_3$, and $C_3H_5$ when subjected to TOF-SIMS.

The cycle performance and the first charge and discharge performance of the secondary batteries in examples 3-1 to 3-3 were investigated. The result is given in Table 3.

TABLE 3

$D50 = 4$ µm, half width 2θ = 2.593, Si(111) crystallite 3.29 nm, SBR/CMC/PAA FEC:EC:DMC(1:2:7 vol %), $LIPF_6$ 1.3 mol/kg, positive electrode $LiCoO_2$ CNT 1 wt %, $Li_2SiO_3$, $Li_4SiO_4$, carbon coating 5 wt % ethylene glycol, lithium carbonate, phosphoryl fluoride, $CH_2$, $C_2H_3$, $C_3H_5$

| Table 3 | Decomposition reaction inhibition coating 2 | Capacity retention rate (%) | Initial efficiency (%) |
|---|---|---|---|
| Example 3-1 | EC polymer | 81.0 | 81.5 |
| Example 3-2 | PC polymer | 81.3 | 81.3 |
| Example 3-3 | EC polymer, PC polymer | 81.2 | 81.2 |

Table 3 shows that when the negative electrode active material particles were further coated with the coating containing at least one of an ethylene carbonate polymer and a propylene carbonate polymer, better battery performances were obtained. It is considered that these coatings further inhibited the decomposition reaction of cyclic carbonates.

Examples 4-1 to 4-3

A secondary battery was produced basically as in example 1-2 except that the negative electrode active material particles were further coated with a coating containing at least one of lithium fluoride and lithium oxide. Specifically, the particles were coated with a coating containing lithium fluoride in example 4-1; lithium oxide in example 4-2; both lithium fluoride and lithium oxide in example 4-3.

All negative electrode active material particles in examples 4-1 to 4-3 had the following physical properties:

The negative electrode active material particles had a median size $D_{50}$ of 4 µm; the half width (2θ) of the diffraction peak attributable to an (111) crystal plane and obtainable by X-ray diffraction was 2.593°; the crystallite size attributable to the (111) crystal plane was 3.29 nm; the negative electrode active material particles contained $Li_2SiO_3$ and $Li_4SiO_4$ in their interior; the amount of the carbon coating was 5 mass % with respect to the total amount of the negative electrode active material particles and the carbon coating.

The coating of the negative electrode active material particles contained ethylene glycol as a substance having two or more hydroxyl groups per molecule, phosphoryl fluoride, lithium carbonate, and hydrocarbons that exhibit positive ion spectra $CH_2$, $C_2H_3$, and $C_3H_5$ when subjected to TOF-SIMS.

The cycle performance and the first charge and discharge performance of the secondary batteries in examples 4-1 to 4-3 were investigated. The result is given in Table 4.

TABLE 4

$D50 = 4$ µm, half width 2θ = 2.593, Si(111) crystallite 3.29 nm, SBR/CMC/PAA FEC:EC:DMC(1:2:7 vol %), $LIPF_6$ 1.3 mol/kg, positive electrode $LiCoO_2$ CNT 1 wt %, $Li_2SiO_3$, $Li_4SiO_4$, carbon coating 5 wt %, EC polymer ethylene glycol, lithium carbonate, phosphoryl fluoride, $CH_2$, $C_2H_3$, $C_3H_5$

| Table 4 | Decomposition reaction inhibition coating 3 | Capacity retention rate (%) | Initial efficiency (%) |
|---|---|---|---|
| Example 4-1 | LiF | 83.2 | 82.0 |
| Example 4-2 | $Li_2O$ | 82.6 | 81.9 |
| Example 4-3 | LiF, $Li_2O$ | 83.1 | 81.8 |

Table 4 shows that when the negative electrode active material particles were further coated with the coating containing at least one of lithium fluoride and lithium oxide, especially the cycle retention rate was improved, and better battery performances were obtained.

Examples 5-1 to 5-10

A secondary battery was produced basically as in example 1-2 except that carbon particles having a median size shown in Table 5 were attached to the surfaces of the negative electrode active material particles via a binder having a carboxyl group.

All negative electrode active material particles in examples 5-1 to 5-10 had the following physical properties:

The negative electrode active material particles had a median size $D_{50}$ of 4 µm; the half width (2θ) of the diffraction peak attributable to an (111) crystal plane and obtainable by X-ray diffraction was 2.593°; the crystallite size attributable to the (111) crystal plane was 3.29 nm; the negative electrode active material particles contained $Li_2SiO_3$ and $Li_4SiO_4$ in their interior; the amount of the carbon coating was 5 mass % with respect to the total amount of the negative electrode active material particles and the carbon coating.

The coating of the negative electrode active material particles contained ethylene glycol as a substance having two or more hydroxyl groups per molecule, phosphoryl fluoride, lithium carbonate, and hydrocarbons that exhibit positive ion spectra $CH_2$, $C_2H_3$, and $C_3H_5$ when subjected to TOF-SIMS. Moreover, the negative electrode active material particles were further coated with a coating containing an ethylene carbonate polymer. Moreover, the negative electrode active material particles were further coated with a coating containing lithium fluoride.

The cycle performance and the first charge and discharge performance of the secondary batteries in examples 5-1 to 5-10 were investigated. The result is given in Table 5.

TABLE 5

FEC:EC:DMC(1:2:7 vol %), $LIPF_6$ 1.3 mol/kg,
positive electrode $LiCoO_2$ CNT 1 wt %, $Li_2SiO_3$, $Li_4SiO_4$,
carbon coating 5 wt %, EC polymer, LiF ethylene glycol,
lithium carbonate, phosphoryl fluoride, $CH_2$, $C_2H_3$, $C_3H_5$

| Table 5 | Carbon particles | Carbon particle binder | Capacity retention rate (%) | Initial efficiency (%) |
|---|---|---|---|---|
| Example 5-1 | 15 nm | PAA | 84.0 | 78.0 |
| Example 5-2 | 20 nm | PAA | 84.5 | 80.0 |
| Example 5-3 | 35 nm | PAA | 84.6 | 83.0 |
| Example 5-4 | 50 nm | PAA | 84.6 | 83.2 |
| Example 5-5 | 100 nm | PAA | 84.5 | 83.3 |
| Example 5-6 | 200 nm | PAA | 83.8 | 83.2 |
| Example 5-7 | 300 nm | PAA | 81.2 | 83.3 |
| Example 5-8 | 35 nm | CMC | 83.9 | 82.8 |
| Example 5-9 | 35 nm | PAA-Na | 83.8 | 83.1 |
| Example 5-10 | 35 nm | CMC-Na | 83.6 | 83.0 |

The carbon particles adhering to the surface layer allowed a sufficient contact between the particles and thus improved the battery performances. The carbon particles require adhering to the negative electrode active material particles. The adhering property is improved by a binder such as, especially, polyacrylic acid. In particular, examples 5-2 to 5-6 and 5-8 to 5-10, where the carbon particles had a median size ranging from 20 nm to 200 nm, exhibited still better battery performances. When the median size is 20 nm or more, a sufficient electronic contact can be obtained, and the surface area of the carbon particles is prevented from becoming too large. Thus, the carbon particles do not adversely affect the battery performances. When the median size is 200 nm or less, carbon particles that do not contribute to the electronic contact are reduced. Thus, many carbon particles are not required to obtain a sufficient electronic contact, and the battery can have sufficient capacity as a whole.

Example 6-1

A secondary battery was produced basically as in example 5-3 except that the coating of the negative electrode active material particles contained propanediol as a substance having two or more hydroxyl groups per molecule, lithium carbonate, phosphoryl fluoride, and hydrocarbons that exhibit positive ion spectra $CH_2$, $C_2H_3$, and $C_3H_5$ when subjected to TOF-SIMS.

The negative electrode active material particles in example 6-1 had the following physical properties:

The negative electrode active material particles had a median size $D_{50}$ of 4 μm; the half width (2θ) of the diffraction peak attributable to an (111) crystal plane and obtainable by X-ray diffraction was 2.593°; the crystallite size attributable to the (111) crystal plane was 3.29 nm; the negative electrode active material particles contained $Li_2SiO_3$ and $Li_4SiO_4$ in their interior; the amount of the carbon coating was 5 mass % with respect to the total amount of the negative electrode active material particles and the carbon coating.

The cycle performance and the first charge and discharge performance of the secondary battery in example 6-1 were investigated. The result is given in Table 6.

TABLE 6

$D50$ = 4 μm, half width 2θ = 2.593, Si(111) crystallite 3.29 nm,
SBR/CMC/PAA FEC:EC:DMC(1:2:7 vol %), $LIPF_6$ 1.3 mol/kg,
positive electrode $LiCoO_2$ CNT 1 wt %, $Li_2SiO_3$, $Li_4SiO_4$, carbon
coating 5 wt %, EC polymer, LiF Carbon particle 35 nm + PAA

| Table 6 | Decomposition reaction inhibition coating 1 | Capacity retention rate (%) | Initial efficiency (%) |
|---|---|---|---|
| Example 6-1 | Propanediol, Lithium carbonate, Phosphoryl fluoride $CH_2$, $C_2H_3$, $C_3H_5$ | 84.5 | 82.9 |

As shown in Table 6, good battery performances were obtained like example 5-3 even when ethylene glycol in example 5-3 was changed to propanediol.

Examples 7-1 to 7-3

A secondary battery was produced basically as in example 5-3 except that, when the silicon compound was bulk-modified, i.e., when the lithium compound was produced, potential, current, and the method for inserting and extracting lithium were changed to adjust the condition of the compound produced in the silicon compound. The electrochemical modification produces $Li_2SiO_3$, $Li_6Si_2O_7$, and $Li_4SiO_4$ inside. In this manner, $Li_2SiO_3$, $Li_6Si_2O_7$, and $Li_4SiO_4$ were produced inside the silicon compound in example 7-1; $Li_2SiO_3$ was produced inside the silicon compound in example 7-2; $Li_4SiO_4$ was produced inside the silicon compound in example 7-3.

The obtained lithium compounds could be quantified by NMR (Nuclear Magnetic Resonance) and XPS (X-ray Photoelectron Spectroscopy). XPS and NMR measurements can be performed, for example, under the following conditions.

Apparatus: an X-ray photoelectron spectroscopy apparatus

X-ray Source: a monochromatic Al—Kα ray

X-ray Spot Diameter: 100 μm

Ar-ion Sputtering Gun Conditions: 0.5 kV, 2 mm×2 mm $^{29}$Si-MAS-NMR

Apparatus: a 700-NMR spectroscope made by Bruker Corp.

Probe: a 4-mm-HR-MAS rotor, 50 μL

Sample Rotation Speed: 10 kHz

Temperature of Measurement Environment: 25° C.

All negative electrode active material particles in examples 7-1 to 7-3 had the following physical properties:

The negative electrode active material particles had a median size $D_{50}$ of 4 μm; the half width (2θ) of the diffraction peak attributable to an (111) crystal plane and obtainable by X-ray diffraction was 2.593°; the crystallite size attributable to the (111) crystal plane was 3.29 nm; the amount of the carbon coating was 5 mass % with respect to the total amount of the negative electrode active material particles and the carbon coating.

The cycle performance and the first charge and discharge performance of the secondary batteries in examples 7-1 to 7-3 were investigated. The result is given in Table 7.

TABLE 7

D50 = 4 µm, half width 2θ = 2.593, Si(111) crystallite 3.29 nm, SBR/CMC/PAA FEC:EC:DMC(1:2:7 vol %), LIPF$_6$ 1.3 mol/kg, positive electrode LiCoO$_2$ CNT 1 wt %, carbon coating 5 wt %, EC polymer, LiF, Carbon particle 35 nm + PAA ethylene glycol, lithium carbonate, phosphoryl fluoride, $CH_2$, $C_2H_3$, $C_3H_5$

| Table 7 | Lithium compound | Capacity retention rate (%) | Initial efficiency (%) |
|---|---|---|---|
| Example 7-1 | $Li_2SiO_3$, $Li_6Si_2O_7$, $Li_4SiO_4$ | 88.0 | 87.5 |
| Example 7-2 | $Li_2SiO_3$ | 88.1 | 86.1 |
| Example 7-3 | $Li_4SiO_4$ | 88.0 | 85.8 |

As shown in Table 7, examples 7-2 and 7-3, where one lithium compound selected from $Li_2SiO_3$, $Li_6Si_2O_7$, and $Li_4SiO_4$ was contained inside the silicon compound, had good battery performances, while example 7-1, where two or more lithium compounds were contained, had better battery performances.

Examples 8-1 to 8-6

A secondary battery was produced basically as in example 5-3 except that the amount of the carbon coating on the negative electrode active material particles was changed such that the content of the carbon coating with respect to the total amount of the negative electrode active material particles and the carbon coating was changed as shown in Table 8. The amount of the carbon coating was adjusted by changing the temperature and treatment time when the silicon compound was subjected to thermal CVD.

All negative electrode active material particles in examples 8-1 to 8-6 had the following physical properties:

The negative electrode active material particles had a median size $D_{50}$ of 4 µm; the half width (2θ) of the diffraction peak attributable to an (111) crystal plane and obtainable by X-ray diffraction was 2.593°; the crystallite size attributable to the (111) crystal plane was 3.29 nm.

The cycle performance and the first charge and discharge performance of the secondary batteries in examples 8-1 to 8-6 were investigated. The result is given in Table 8.

TABLE 8

D50 = 4 µm, half width 2θ = 2.593, Si(111) crystallite 3.29 nm, SBR/CMC/PAA FEC:EC:DMC(1:2:7 vol %), LIPF$_6$ 1.3 mol/kg, positive electrode LiCoO$_2$ CNT 1 wt %, EC polymer, LiF, Carbon particle 35 nm + PAA, $Li_2SiO_3$, $Li_4SiO_4$, ethylene glycol, lithium carbonate, phosphoryl fluoride, $CH_2$, $C_2H_3$, $C_3H_5$

| Table 8 | Amount of carbon coating (mass %) | Capacity retention rate (%) | Initial efficiency (%) |
|---|---|---|---|
| Example 8-1 | — | 76.0 | 78.0 |
| Example 8-2 | 0.1 | 80.3 | 80.0 |
| Example 8-3 | 3 | 82.0 | 81.5 |
| Example 5-3 | 5 | 84.6 | 83.0 |
| Example 8-4 | 10 | 84.5 | 83.3 |
| Example 8-5 | 15 | 84.6 | 83.6 |
| Example 8-6 | 20 | 84.5 (capacity down) | 83.7 |

As shown in Table 8, a minute amount of the carbon coating could improve the conductivity and thus the battery performances. Moreover, when the amount of the carbon coating ranged from 0.1 mass % to 15 mass %, the battery capacity was prevented from degrading. Example 8-6 had lower battery capacity than examples 8-2 to 8-5.

Examples 9-1 to 9-9

A secondary battery was produced as in example 5-3 except that the crystallinity of the silicon compound was changed. The crystallinity can be changed by heat treatment under a non-atmospheric condition after insertion and extraction of lithium. Table 9 shows the half width of the silicon compound in examples 9-1 to 9-9. Although example 9-9 exhibited a half width of 20° or more, this value was obtained by fitting with analysis software because the peak value was not obtained. The silicon compound in example 9-9 was substantially amorphous.

All negative electrode active material particles in examples 9-1 to 9-9 had a median size $D_{50}$ of 4 µm.

The cycle performance and the first charge and discharge performance of the secondary batteries in examples 9-1 to 9-9 were investigated. The result is given in Table 9.

TABLE 9

D50 = 4 µm, carbon coating 5 wt %, SBR/CMC/PAA FEC:EC:DMC(1:2:7 vol %), LIPF$_6$ 1.3 mol/kg, positive electrode LiCoO$_2$ CNT 1 wt %, EC polymer, LiF, Carbon particle 35 nm + PAA, $Li_2SiO_3$, $Li_4SiO_4$, ethylene glycol, lithium carbonate, phosphoryl fluoride, $CH_2$, $C_2H_3$, $C_3H_5$

| Table 9 | half width 2θ ( ) | Si(111) crystallite size (nm) | Capacity retention rate (%) | Initial efficiency (%) |
|---|---|---|---|---|
| Example 9-1 | 0.756 | 11.42 | 75.0 | 84.0 |
| Example 9-2 | 0.796 | 10.84 | 76.0 | 83.6 |
| Example 9-3 | 1.025 | 8.55 | 77.0 | 83.2 |
| Example 9-4 | 1.218 | 7.21 | 80.0 | 83.0 |
| Example 9-5 | 1.271 | 6.63 | 81.0 | 83.0 |
| Example 9-6 | 1.845 | 4.62 | 82.0 | 83.0 |
| Example 9-7 | 2.257 | 3.77 | 83.0 | 83.0 |
| Example 5-3 | 2.593 | 3.29 | 84.6 | 83.0 |
| Example 9-8 | 10.123 | 1.524 | 85.0 | 83.0 |
| Example 9-9 | 20.221 | 0 | 85.5 | 83.0 |

As shown in Table 9, the capacity retention rate and the initial efficiency changed in response to the variation in crystallinity of the silicon compound. In particular, a high retention rate and a high initial efficiency were obtained by low crystallinity materials with a half width of 1.2° or more and a crystallite size of 7.5 nm or less, which is attributable to an Si(111) crystal plane. The best battery performances were obtained when the silicon compound was amorphous.

Examples 10-1 to 10-7

A secondary battery was produced as in example 5-3 except that the median size of the silicon compound was changed. FIG. 10 shows the median size of the silicon compound in examples 10-1 to 10-7.

All negative electrode active material particles in examples 10-1 to 10-7 had the following physical properties:

The half width (2θ) of the diffraction peak attributable to an (111) crystal plane and obtainable by X-ray diffraction was 2.593°; the crystallite size attributable to the (111) crystal plane was 3.29 nm.

The cycle performance and the first charge and discharge performance of the secondary batteries in examples 10-1 to 10-7 were investigated. The result is given in Table 10.

TABLE 10 carbon coating 5 wt %, half width 2θ = 2.593, Si(111) crystallite 3.29 nm, SBR/CMC/PAA FEC:EC:DMC(1:2:7 vol %), LIPF$_6$ 1.3 mol/kg, positive electrode LiCoO$_2$ CNT 1 wt %, EC polymer, LiF, Carbon particle 35 nm + PAA, Li$_2$SiO$_3$, Li$_4$SiO$_4$, ethylene glycol, lithium carbonate, phosphoryl fluoride, CH$_2$, C$_2$H$_3$, C$_3$H$_5$

| Table 10 | Median size (μm) | Capacity retention rate (%) | Initial efficiency (%) |
|---|---|---|---|
| Example 10-1 | 0.3 | 79.0 | 78.0 |
| Example 10-2 | 0.5 | 80.0 | 81.0 |
| Example 10-3 | 1 | 82.6 | 82.0 |
| Example 5-3 | 4 | 84.6 | 83.0 |
| Example 10-4 | 8 | 84.5 | 83.0 |
| Example 10-5 | 10 | 83.2 | 83.0 |
| Example 10-6 | 20 | 81.0 | 82.0 |
| Example 10-7 | 30 | 77.0 | 79.0 |

As shown in Table 10, when the median size of the silicon compound particle ranged from 0.5 μm to 20 μm, the capacity retention rate and the initial efficiency were kept high.

Examples 11-1 to 11-8

A secondary battery was produced basically as in example 5-3 except that the content of the carbon-based active material mixed with the inventive negative electrode material was changed.

Table 11 shows the content of the silicon compound with respect to the total amount of the negative electrode active material in the negative electrode.

All negative electrode active material particles in examples 11-1 to 11-8 had the following physical properties:

The negative electrode active material particles had a median size D$_{50}$ of 4 μm; the half width (2θ) of the diffraction peak attributable to an (111) crystal plane and obtainable by X-ray diffraction was 2.593°; the crystallite size attributable to the (111) crystal plane was 3.29 nm.

The cycle performance and the first charge and discharge performance of the secondary batteries in examples 11-1 to 11-8 were investigated. The result is given in Table 11.

TABLE 11

FEC:EC:DMC(1:2:7 vol %), LIPF$_6$ 1.3 mol/kg, positive electrode LiCoO$_2$ CNT 1 wt %, EC polymer, LiF, Carbon particle 35 nm + PAA, Li$_2$SiO$_3$, Li$_4$SiO$_4$, ethylene glycol, lithium carbonate, phosphoryl fluoride, CH$_2$, C$_2$H$_3$, C$_3$H$_5$

| Table 11 | Silicon compound content (mass %) | Capacity retention rate (%) | Initial efficiency (%) |
|---|---|---|---|
| Example 11-1 | 3 | 92.0 | 91.5 |
| Example 11-2 | 4 | 91.5 | 91.0 |
| Example 11-3 | 5 | 91.0 | 89.0 |
| Example 11-4 | 6 | 90.0 | 87.5 |
| Example 11-5 | 10 | 88.1 | 87.0 |
| Example 11-6 | 15 | 87.6 | 86.0 |
| Example 11-7 | 30 | 86.9 | 84.6 |
| Example 11-8 | 50 | 86.0 | 84.0 |
| Example 5-3 | 100 | 84.6 | 83.0 |

The battery having less silicon compound and more carbon-based active material could easily exhibit a property of the carbon-based active material, providing good battery performances.

However, a typical carbon material has a reversible capacity of about 330 mAh/g while a silicon material has sufficiently high capacity, specifically, 1500 mAh/g (0V to 1.2V). Thus, addition of the silicon material significantly improves the battery capacity in practical use, although reducing the battery capacity retention rate. In particular, the silicon material has higher discharge potential than the carbon material. The battery capacity is thus difficult to be substantially improved.

It was then estimated how much the actual silicon material is required to improve the battery capacity. Consequently, it was revealed that the capacity was improved when about 4 mass % of the silicon material was added.

Figure 4:
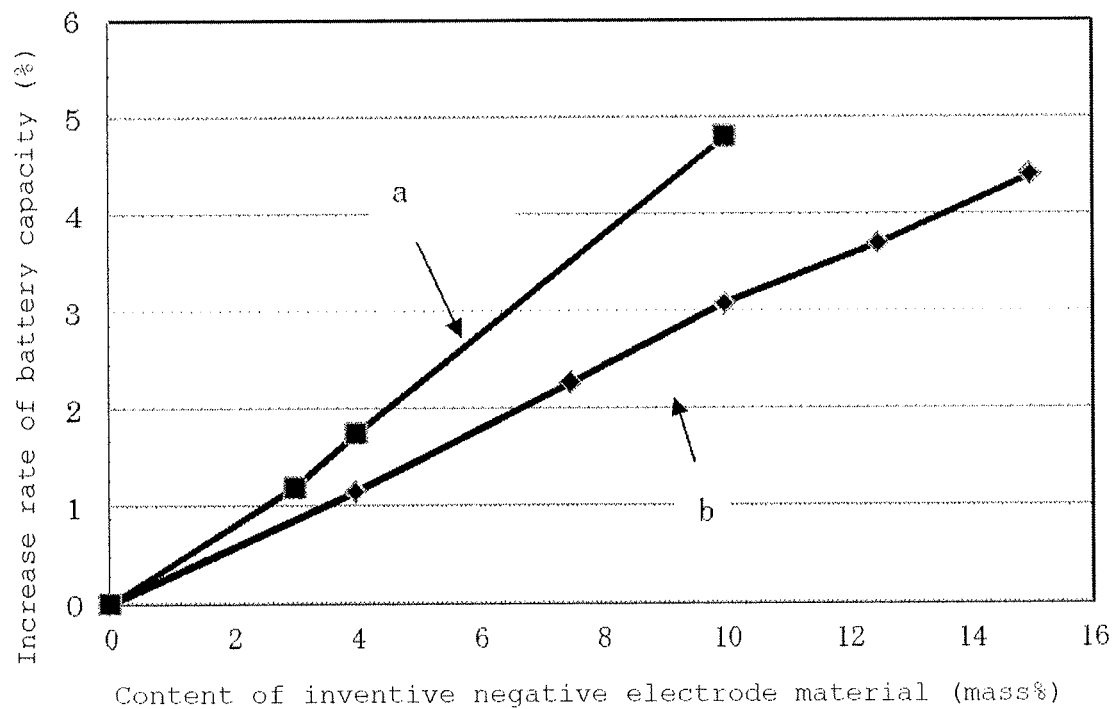
FIG. 4 is a diagram showing an increase rate of the battery capacity when the amount of the negative electrode active material particles of the inventive negative electrode material for a non-aqueous electrolyte secondary battery is increased in a negative electrode active material.

FIG. 4 is a graph showing a relationship between the content of the inventive negative electrode material with respect to the total amount of the negative electrode material and an increase rate of the secondary battery.

Line a in the graph of FIG. 4 shows an increase rate of the battery capacity when the content of the inventive negative electrode material was increased in the negative electrode active material. Line b in the graph of FIG. 4 shows an increase rate of the battery capacity when the content of a silicon-based active material that was not doped with lithium was increased. As can be seen from FIG. 4, when the content of the inventive negative electrode material was 4 mass % or more in the negative electrode active material, the increase rate of the battery capacity became larger than the conventional one, and volume energy density was significantly increased in particular.

Example 12-1

A secondary battery was produced basically as in example 5-3 except that carbon nanotube (CNT) was not added as conductive additive when the negative electrode mixture slurry was produced in example 12-1.

The negative electrode active material particles in example 12-1 had the following physical properties:

The negative electrode active material particles had a median size D$_{50}$ of 4 μm; the half width (2θ) of the diffraction peak attributable to an (111) crystal plane and obtainable by X-ray diffraction was 2.593°; the crystallite size attributable to the (111) crystal plane was 3.29 nm.

The cycle performance and the first charge and discharge performance of the secondary battery in example 12-1 were investigated. The result is given in Table 12.

TABLE 12

D50 = 4 μm, carbon coating 5 wt %, half width 2θ = 2.593, Si(111)
crystallite 3.29 nm, SBR/CMC/PAA FEC:EC:DMC(1:2:7 vol %),
LIPF$_6$ 1.3 mol/kg, positive electrode LiCoO$_2$ EC polymer, LiF,
Carbon particle 35 nm + PAA, Li$_2$SiO$_3$, Li$_4$SiO$_4$, ethylene glycol,
lithium carbonate, phosphoryl fluoride, CH$_2$, C$_2$H$_3$, C$_3$H$_5$

| Table 12 | CNT | Capacity retention rate (%) | Initial efficiency (%) |
|---|---|---|---|
| Example 12-1 | None | 80.3 | 83.1 |
| Example 5-3 | 1 wt % | 84.6 | 83.0 |

As shown in Table 12, when CNT was added, both the capacity retention rate and the initial efficiency were more improved. This indicates that addition of CNT to the negative electrode allowed an electronic contact between the silicon-based active material (the SiO material) and the carbon-based active material, thus improving the battery performances.

It is to be noted that the present invention is not limited to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A negative electrode material for a non-aqueous electrolyte secondary battery, wherein the negative electrode material is before producing a negative electrode, comprising:
   negative electrode active material particles composed of a silicon compound expressed by SiO$_x$ containing a lithium compound where 0.5≤x≤1.6, wherein before being used in the production of a negative electrode that uses the negative electrode material, the negative electrode active material particles are coated with a coating containing at least two of:
   a) a substance having two or more hydroxyl groups per molecule, wherein the substance having two or more hydroxyl groups per molecule comprises at least one of ethylene glycol and propanediol,
   b) phosphoryl fluoride,
   c) lithium carbonate, and
   d) a hydrocarbon that exhibits a positive ion spectrum C$_y$H$_z$ when subjected to TOF-SIMS where 1≤y≤3 and 2≤z≤5; wherein the values of x, y and z are quantified with respect to the negative electrode active material particles of the negative electrode material.

2. The negative electrode material for a non-aqueous electrolyte secondary battery according to claim 1, wherein before being used in the production of a negative electrode that uses the negative electrode material the negative electrode active material particles are further coated with a coating containing at least one of an ethylene carbonate polymer and a propylene carbonate polymer.

3. The negative electrode material for a non-aqueous electrolyte secondary battery according to claim 1, wherein before being used in the production of a negative electrode that uses the negative electrode material the negative electrode active material particles are further coated with a coating containing at least one of lithium fluoride and lithium oxide.

4. The negative electrode material for a non-aqueous electrolyte secondary battery according to claim 1, wherein before being used in the production of a negative electrode that uses the negative electrode material the negative electrode active material particles are coated with a carbon coating.

5. The negative electrode material for a non-aqueous electrolyte secondary battery according to claim 4, wherein an amount of the carbon coating ranges from 0.1 mass % to 15 mass % with respect to a total amount of the negative electrode active material particles and the carbon coating.

6. The negative electrode material for a non-aqueous electrolyte secondary battery according to claim 1, wherein carbon particles adhere to surfaces of the negative electrode active material particles via a binder having a carboxyl group.

7. The negative electrode material for a non-aqueous electrolyte secondary battery according to claim 6, wherein the carbon particles adhering to the negative electrode active material particles have a median size ranging from 20 nm to 200 nm.

8. The negative electrode material for a non-aqueous electrolyte secondary battery according to claim 6, wherein the binder having a carboxyl group comprises at least one of carboxymethyl cellulose, a metal salt thereof, polyacrylic acid, and a metal salt thereof.

9. The negative electrode material for a non-aqueous electrolyte secondary battery according to claim 1, wherein at least one of Li$_2$SiO$_3$, Li$_6$Si$_2$O$_7$, and Li$_4$SiO$_4$ is contained inside the silicon compound as the lithium compound contained in the silicon compound.

10. The negative electrode material for a non-aqueous electrolyte secondary battery according to claim 1, wherein the silicon compound exhibits a diffraction peak having a half width (2θ) of 1.2° or more, the diffraction peak being attributable to a (111) crystal plane and obtained when X-ray diffraction is performed on the silicon compound, and a crystallite size attributable to the crystal plane is 7.5 nm or less.

11. The negative electrode material for a non-aqueous electrolyte secondary battery according to claim 1, wherein the negative electrode active material particles have a median size ranging from 0.5 μm to 20 μm.

12. A negative electrode for a non-aqueous electrolyte secondary battery, comprising the negative electrode material according to claim 1, wherein an amount of the silicon compound is 4 mass % or more with respect to a total amount of a negative electrode active material in the negative electrode for a non-aqueous electrolyte secondary battery.

13. The negative electrode for a non-aqueous electrolyte secondary battery according to claim 12, further comprising a carbon nanotube.

14. The negative electrode for a non-aqueous electrolyte secondary battery according to claim 12, wherein a layer of the negative electrode active material contains carboxymethyl cellulose or a metal salt thereof, polyacrylic acid or a metal salt thereof, and styrene-butadiene rubber as binders.

15. A non-aqueous electrolyte secondary battery comprising a positive electrode containing a positive electrode active material, the negative electrode according to claim 12, and a non-aqueous electrolyte containing a non-aqueous solvent, a supporting salt, and an additive.

16. The non-aqueous electrolyte secondary battery according to claim 15, wherein the non-aqueous electrolyte contains either or both of a chain carbonate and a cyclic carbonate as the non-aqueous solvent.

17. A method of producing negative electrode active material particles contained in a negative electrode material for a non-aqueous electrolyte secondary battery, wherein the negative electrode material is before producing a negative electrode, the method comprising:

producing a silicon compound expressed by $SiO_x$ where $0.5 \leq x \leq 1.6$;

inserting lithium into the silicon compound and thereby forming a lithium compound in the silicon compound to modify the silicon compound;

before producing the negative electrode that contains the negative electrode material, coating the silicon compound with a coating containing at least two of:
  a) a substance having two or more hydroxyl groups per molecule, wherein the substance having two or more hydroxyl groups per molecule comprises at least one of ethylene glycol and propanediol,
  b) phosphoryl fluoride,
  c) lithium carbonate, and
  d) a hydrocarbon that exhibits a positive ion spectrum $C_yH_z$ when subjected to TOF-SIMS where $1 \leq y \leq 3$ and $2 \leq z \leq 5$, whereby the negative electrode active material particles are produced; wherein the values of x, y and z are quantified with respect to the negative electrode active material particles of the negative electrode material.

18. The method of producing negative electrode active material particles according to claim 17, wherein modifying the silicon compound and coating the silicon compound with the coating are simultaneously performed in an electrochemical manner.

* * * * *